United States Patent
Fujita et al.

(10) Patent No.: US 6,626,458 B2
(45) Date of Patent: Sep. 30, 2003

(54) STEERING WHEEL HAVING AIRBAG APPARATUS

(75) Inventors: Yoshiyuki Fujita, Aichi-ken (JP); Motoi Isomura, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/953,159

(22) Filed: Sep. 17, 2001

(65) Prior Publication Data

US 2002/0036397 A1 Mar. 28, 2002

(30) Foreign Application Priority Data

Sep. 26, 2000 (JP) .................................... 2000-293164
Sep. 26, 2000 (JP) .................................... 2000-293166

(51) Int. Cl.$^7$ ............................................. B60R 21/20
(52) U.S. Cl. ................................. 280/728.3; 280/731
(58) Field of Search ........................... 280/731, 743.1, 280/728.3, 728.2

(56) References Cited

U.S. PATENT DOCUMENTS

| | | | | |
|---|---|---|---|---|
| 4,148,503 A | * | 4/1979 | Shiratori et al. | 280/731 |
| 5,893,581 A | * | 4/1999 | Niederman | 280/731 |
| 6,109,646 A | * | 8/2000 | Nagata et al. | 280/731 |
| 6,142,510 A | * | 11/2000 | Endo et al. | 280/731 |
| 6,161,863 A | * | 12/2000 | Fujita et al. | 280/728.2 |
| 6,247,724 B1 | * | 6/2001 | Jambor et al. | 280/731 |
| 6,422,602 B1 | * | 7/2002 | Ishii et al. | 280/743.1 |
| 6,435,547 B2 | * | 8/2002 | Igawa | 280/731 |

FOREIGN PATENT DOCUMENTS

| | | |
|---|---|---|
| JP | 10100907 | 4/1998 |
| JP | 11011246 | 1/1999 |

* cited by examiner

*Primary Examiner*—Paul N. Dickson
*Assistant Examiner*—David R. Dunn
(74) *Attorney, Agent, or Firm*—Posz & Bethards, PLC

(57) ABSTRACT

A steering wheel of the present invention has an airbag apparatus. The airbag apparatus has a pad for covering the airbag, and the pad has a plurality of doors that can open. Each door opens around a hinge as a rotation center. The hinge is located below an outer periphery of the pad. That is, an area of the door itself can widely be secured, and the door can open as wide as possible. A switch operating portion is disposed in an area other than the door, but of a boss or a spoke that is not covered with the door when it opens. When doors open around the hinge as the rotation center, the doors are disposed in the three spaces between the spokes. The opened doors are disposed smoothly in the three spaces between the three spokes without interference with the switch operating portion. A widely opening state of each door can stably be secure.

9 Claims, 31 Drawing Sheets

STEERING WHEEL HAVING AIRBAG APPARATUS

The present application claims priority to Japanese patent application of Fujita et al, filed Sep. 26, 2000, No.2000-293164, and Japanese patent application of Fujita et al, filed Sep. 26, 2000, No.2000-293166, the entirety of each is hereby incorporated into the present application by this reference.

BACKGROUND OF THE INVENTION

1. Field of the Invention

The present invention relates to a steering wheel for a vehicle having an airbag apparatus. More particularly, the invention relates to a steering wheel having an airbag apparatus and in which switch operating portion of a function part is disposed. Examples of the function part are drive monitor switch, constant-speed running apparatus, audio equipment, air conditioner equipment, navigation system, telephone, shift change and the like.

2. Description of Related Art

Conventionally, a steering wheel having an airbag apparatus is know in Japanese Patent Applications Laid-open No.100907/1998 and No.11246/1999. The airbag apparatus comprises an airbag, an inflator, a pad and a bag holder. The airbag is folded such that the airbag can expand. The inflator supplies expansion gas to the airbag. The pad covers the folded airbag. The bag holder holds the airbag, the inflator and the pad, and is connected to a steering wheel body.

The pad includes a door that is pushed by the expanding airbag and opened. The door is provided at its periphery with a to-be ruptured portion, and is provided at its portion of an outer periphery with a hinge. The door is pushed when the airbag expands to rupture the to-be ruptured portion, and opens around the hinge as a rotation center.

In these days, it is increasingly required to dispose switch operating portions for the function part that are drive monitor switch, constant-speed running apparatus, audio equipment, air conditioner equipment, navigation system, telephone, shift change and the like on the pad of the boss or the spokes near the boss. These switch operating portions are constituted such that they can be operated from above. That is, the switch operating portion comprised operation button or operation lever operated by being pushed downward or swung. In order to facilitate the operation of the switch operating portion, the switch operating portion is disposed upward such that its operating surface approaches a ring surface. The ring surface is the plane formed by an upper surface of a ring when the steering wheel is viewed from a direction perpendicular to a steering shaft.

However, when the airbag is developed and expanded when a driver is close to the steering wheel, it is necessary that the airbag does not apply a partial pushing force to the driver. For this purpose, it is preferable to develop the airbag widely at initial stage of expansion and to inflate the airbag toward the driver. At that time, if the door of the pad interferes with the switch operating portion uselessly, the door can not open widely. That is, the airbag at its initial expanding stage can not be developed widely.

In the present specification, the upper-lower, front-rear and right-left directions are based on the steering shaft when the steering wheel is mounted to the vehicle unless otherwise stated. That is, the upper-lower direction in the present specification is a vertical direction along the axial direction of the steering shaft. The front-rear direction in the present specification is the front and rear direction (a longitudinal direction) of the vehicle along a direction perpendicular to the axis of the steering shaft when the steering wheel is steered straightly.

SUMMARY OF THE INVENTION

The present invention solves the above problems. That is, the present invention provides a steering wheel having an airbag apparatus capable of widely open a door of a pad even if a switch operating portion is disposed.

A first steering wheel having an airbag apparatus of the present invention has the following structure. That is, the steering wheel comprises a ring grasped at the time of steering, a boss disposed on a center of the ring, three spokes for connecting the ring and the boss, and a space between the spokes. The steering wheel also includes, as constituent parts, a steering wheel body, the airbag apparatus disposed on the boss, and a switch operating portion that can be operated from above. The switch operating portion is disposed at least one of the boss and the spoke. The airbag apparatus comprises an airbag folded such that the airbag can expand, an inflator for supplying expansion gas to the airbag, a pad for covering the folded airbag. Further the airbag apparatus comprises a bag holder connected to the steering wheel body for holding the folded airbag, the inflator and the pad. The pad includes three doors such that one opening through which the airbag projects can be formed in a center of the pad. Each of the doors is provided at its periphery with to-be ruptured portion. And hinges are disposed on the periphery side of each of the doors. The door is pushed by the airbag when it is expanded and the to-be ruptured portion is ruptured, the door opens around a hinge disposed on the side of an outer periphery of the pad as a rotation center. A pad is held against the bag holder in the proximity to the hinge of each of the doors. The hinge of each of the doors is disposed at a position near the space between the spokes, and on the side of an outer periphery of the pad that is lower than an portion above a holding portion by the bag holder near the hinge. Each of the doors is disposed in the three spaces between the spokes when the door opens around the hinge as a rotation center. The switch operating portion is disposed on an area other than the doors and on the boss or the spoke that is not covered with the door when it opens.

According to the first steering wheel of the present invention, if the airbag is expanded to push the three doors of the pad, each of the doors of the pad ruptures the to-be ruptured portion there around and opens around the hinge as the rotation center.

At that time, the hinge of each door is disposed at a position near the space between the spokes and at the side of the outer periphery of the pad lower than a portion above the holding portion by the bag holder near the hinge. Thus, the door opens around the hinge as the rotation center at a position lower than the outer periphery of the pad. That is, the door can secure the wide area of its own and can open as wide as possible.

If the hinge of the door is disposed above the holding portion by the bag holder, the area of the door itself becomes narrow. Thus, the door can not open widely.

Further, the switch operating portion is disposed in an area other than the doors, but of a boss or a spoke that is not covered with the doors when they open. When doors open around the hinge as the rotation center, the doors are arranged so as to be disposed in the three spaces between the spokes. The opened doors are disposed smoothly in the three spaces between the three spokes without interference with the switch operating portion. A widely opening state of each door can stably be secure.

Therefore, according to the first steering wheel having the airbag apparatus of the present invention, even if the switch operating portion is disposed in an area of the boss or the spoke, the doors of the pad can widely open. Thus, in the first steering wheel, the initial expanding airbag can widely develop.

It is preferable that the to-be ruptured portion at a portion of the adjacent doors is substantially T-shape as viewed from above. That is, the to-be ruptured portion has a lateral line portion disposed in the right-left direction and a longitudinal line portion extending rearward from a substantially central portion of the lateral line portion. The left and right opposite ends of the lateral line portion are directed to disposition directions of the front left and right spokes of the spokes, and a rear end of the longitudinal line portion is directed to a disposition direction of the rear spoke in the spoke. With this steering wheel, the following working effect can be obtained.

That is, in the three spokes type steering wheel, the front space is set greater than rear left and right spaces so that the measuring instruments of the instrument panel can easily be seen. Therefore, if the to-be ruptured portions adjacent to the doors are substantially T in shape, the front door in front of the lateral line portion of the to-be ruptured portion has a greater area. The left and right doors divided by the rear longitudinal line portion that is behind the lateral line portion have a smaller area. As a result, shapes of the front, left and right doors can easily be fit to the front, left and right spaces in which the doors are accommodated when they opens. That is, the shapes of the front, left and right doors can easily be set.

Further, the pad may be provided with the following ceiling wall and side wall. The ceiling wall is disposed on an upper portion of the pad and has the doors and the to-be ruptured portion. The side wall extends downward from the ceiling wall and is disposed in the vertical direction such that the side wall can be connected to the bag holder. A remaining portion of the to-be ruptured portion except adjacent portions which adjoin the doors is disposed close to an inner surface of the side wall of the ceiling wall and substantially along the side wall. With this pad, the following working effect can be obtained.

That is, the side wall of the pad increases the thickness of the ceiling wall. Then the remaining portion of the to-be ruptured portion except adjacent portions of the doors approaches the inner surface of the side wall portion which increases the thickness of the ceiling wall. Therefore, stress concentration is prone to be generated in the remaining portions. Further, the remaining portions are disposed along the general portion of the side wall. Therefore, the remaining portions rupture easily along the general portion. As a result, the to-be ruptured portion easily ruptures and the doors smoothly open.

Further, it is preferable that three clots when the airbag is folded are disposed below the front, left and right doors. With this structure, when the airbag is developed and expanded, the front, left and right doors are reliably pushed by the folded portions disposed below, and the airbag can smoothly open.

A second steering wheel having an airbag apparatus of the present invention has the following structure. That is, the steering wheel comprises a ring grasped at the time of steering, a boss disposed on a center of the ring, and a spoke for connecting the ring and the boss. The airbag apparatus is disposed on an upper portion of the boss. The airbag apparatus comprises an airbag that is folded such that it can be expanded, and a pad for covering the folded airbag. The pad includes a door that is pushed and opened by the expanding airbag. A switch operating portion is disposed below the door when it is opened. The switch operating portion is disposed in a non-limited region where an opening-completion state of the door is not limited for the door that has completed its opening operation.

According to the second steering wheel of the invention, if the airbag is expanded to push the door of the pad, the door opens, and the airbag projects from the pad. At that time, the switch operating portion is disposed in the non-limited region where the opening-completion state of the door is not limited to the door when it has been opened. Thus, the door can complete its opening in a widely opened state without limited by the switch operating portion.

Thus, according to the second steering wheel having the airbag apparatus of the present invention, even if the switch operating portion is disposed below the pad door when the door opens, the pad door can be opened widely. Thus, in the second steering wheel, the airbag in its initial expanding state can be widely developed.

This second invention is not limited to the three spoke type steering wheel, and the invention can also be applied to two or four spoke type steering wheel. The number of the doors of the pad is not limited to three, and one or more doors may be provided.

In the second steering wheel, it is preferable that the switch operating portion is disposed in the non-limited region when the switch operating portion is pushed and moved by the door when it opens. With this structure, in a normal state before the door opens, the switch operating portion can be disposed near the ring surface located upper position. Thus, in the second steering wheel, even if the switch operating portion is disposed below the pad door when it opens, a widely opening state of the door can be secured, and the operability of the switch operating portion becomes excellent.

In this case, when the switch operating portion is pushed and moved by the door, the switch operating portion may be lowered into the non-limited region.

When the switch operating portion includes an operation button that is pushed down for operation, the switch operating portion may be constructed as follows. That is, it is preferable that when the switch operating portion is pushed and moved by the door, the switch operating portion is rotated and moved in the lateral direction that intersects with an operation direction of the operation button substantially at right angles so that the switch operating portion is moved to the non-limited region. In this case, even if the operation button that must be operated downward strongly at the time of operation is disposed on the switch operating portion, no problem is caused. This is because even if the switch operating portion is pushed down unnecessarily strongly during normal operation, the switch operating portion is not prone to move into the non-limited region. Thus the operability of the switch operating portion is stabilized.

Of course, in the second steering wheel, the switch operating portion may previously disposed in the non-limited region of the door.

DESCRIPTION OF THE PREFERRED EMBODIMENTS

Figure 1:
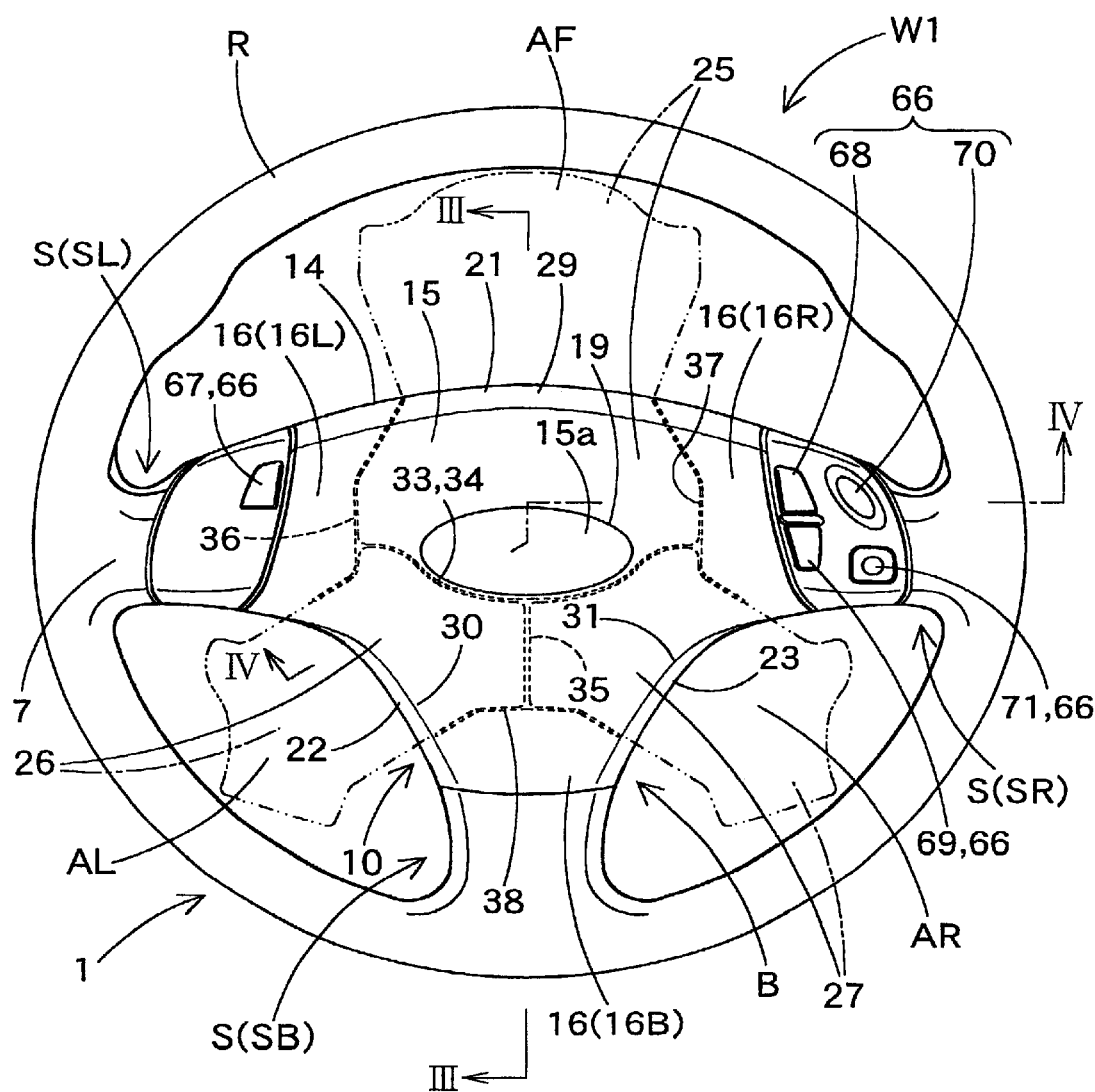
FIG. 1 is a plan view of a steering wheel of a first embodiment of the present invention, and is a plan view showing a door of a pad.

The invention will be described below by way of embodiments shown in the drawings. In addition, the invention is not limited to the embodiments. All modifications within the requirements of the claims and equivalents will respect to the requirements should be included in the scope of the claims.

As shown in FIGS. 1 to 4, a steering wheel W1 of a first embodiment is of three spokes type, and comprises a ring R, a boss B and three spokes S (SL, SR, and SB). The ring R is annular in shape and is grasped at the time of steering operation. The boss B is disposed at a center of the ring R. Each of the spokes S connects the ring R and the boss B with each other. The steering wheel W1 comprises, as constituent parts, a steering wheel body 1, an airbag apparatus 10, and a switch operating portion 66. The airbag apparatus 10 is disposed on an upper portion of the boss B.

The steering wheel body 1 includes a steering wheel core 2 and a lower cover 8. The steering wheel core 2 is disposed such as to connect each part of the ring R, the boss B and the spokes S. The lower cover 8 is disposed such as to cover a lower portion of the boss B.

The steering wheel core 2 comprises a ring core 3, a boss core 4 and three spoke cores 5. The ring core 3 is disposed on the ring R and its cross section is of reversed U-shape. The boss core 4 is connected to a steering shaft 80 (see FIG. 3). Each of the spoke cores 5 connects the boss core 4 and the ring core 3 with each other. The ring core 3 and the spoke cores 5 on the side of the ring core 3 are covered with synthetic resin covering layer 7.

The boss core 4 comprises a steel boss 4a and a covering portion 4b made of aluminum alloy, magnesium alloy or the like. The boss 4a is connected to the steering shaft 80 with each other. The covering portion 4b covers circumference of the boss 4a cylindrically. The covering portion 4b is integrally die cast together with the ring core 3 and the spoke cores 5.

Each of the spoke cores 5 extends from the covering portion 4b of the boss core 4 toward diagonally upward ring core 3. A rear core 5a of the spoke core 5 extends rearward from the covering portion 4b, and connected to the ring core 3. The rear core 5a is bifurcated on the side of the covering portion 4b and the bifurcated portions are converged to the side of the ring core 3 as a single piece. Two branches 5b at a the bifurcated location is formed with mounting seats 5c. Each of the mounting seats 5c includes a mounting hole 5d for mounting the airbag apparatus 10.

Figure 3:
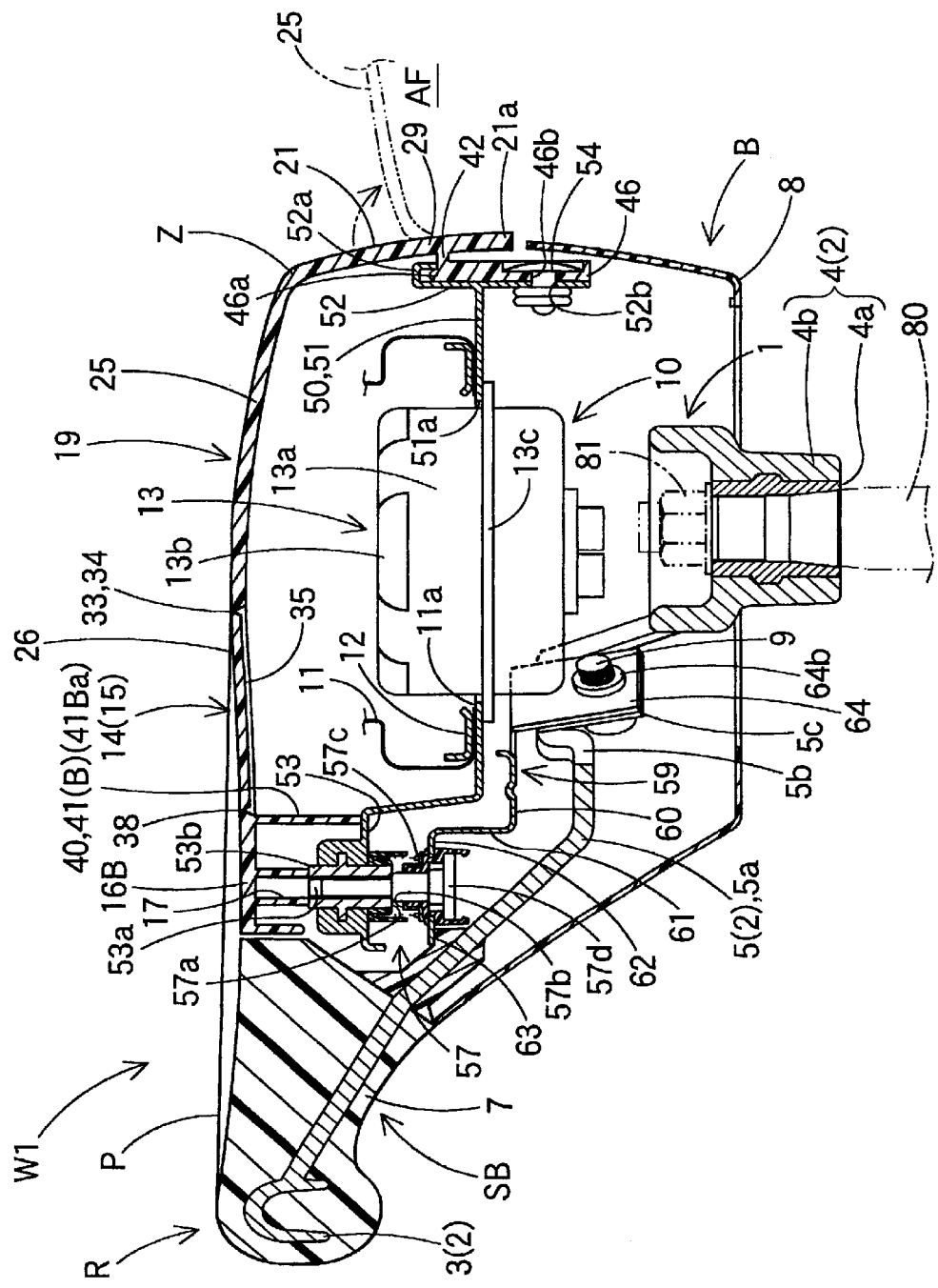
FIG. 3 is a schematic sectional view of the steering wheel of the first embodiment taken along a line III—III in FIG. 1.
Figure 4:
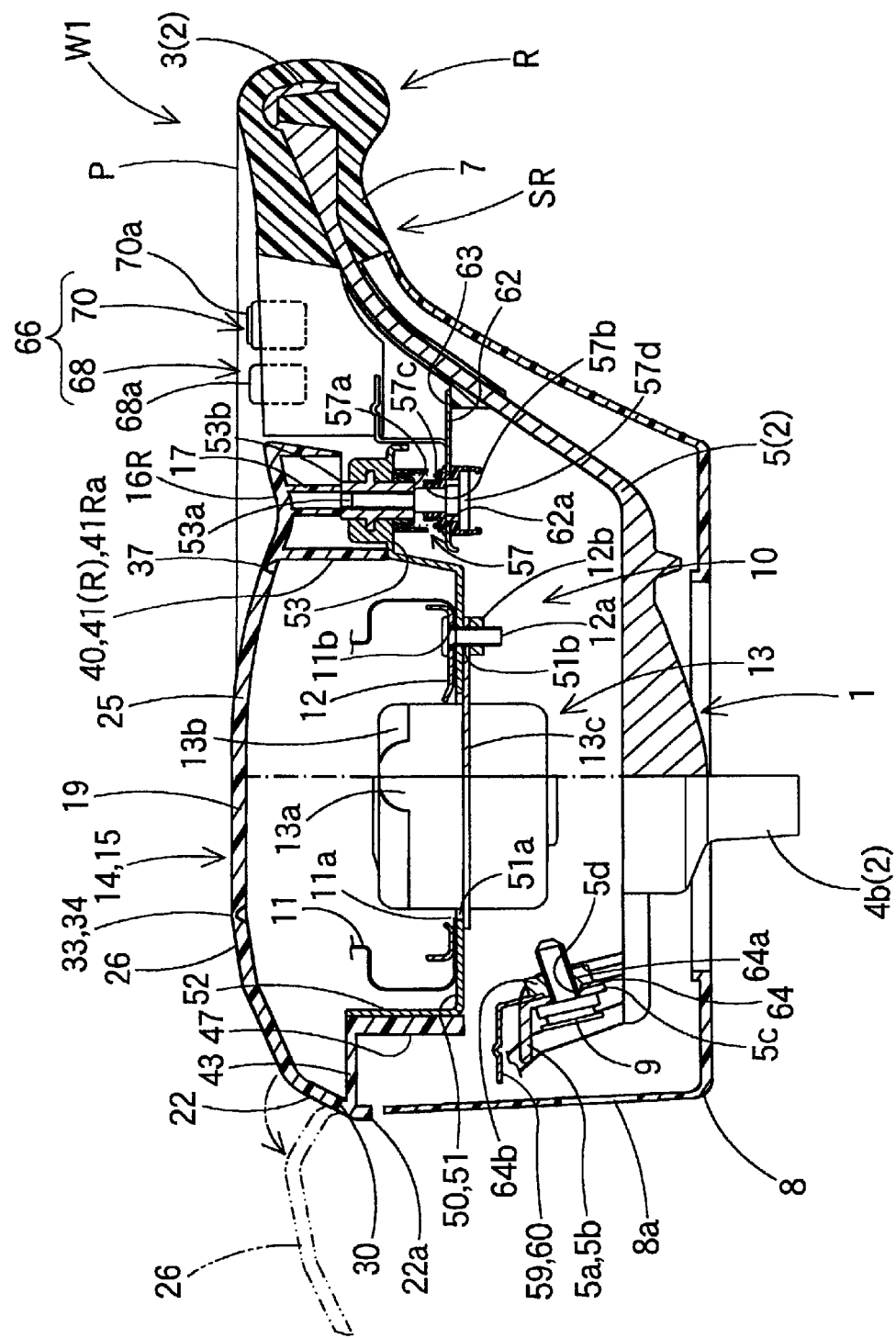
FIG. 4 is a schematic sectional view of the steering wheel of the first embodiment taken along a line IV—IV in FIG. 1.
Figure 5:
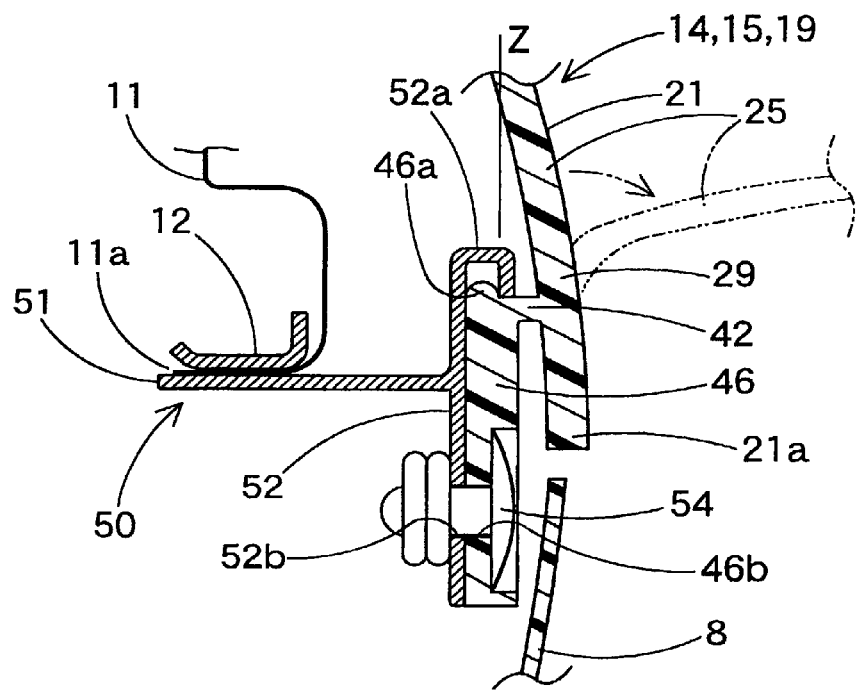
FIG. 5 is a schematic enlarged sectional view showing a hinge of a front door of a pad of the first embodiment.
Figure 6:
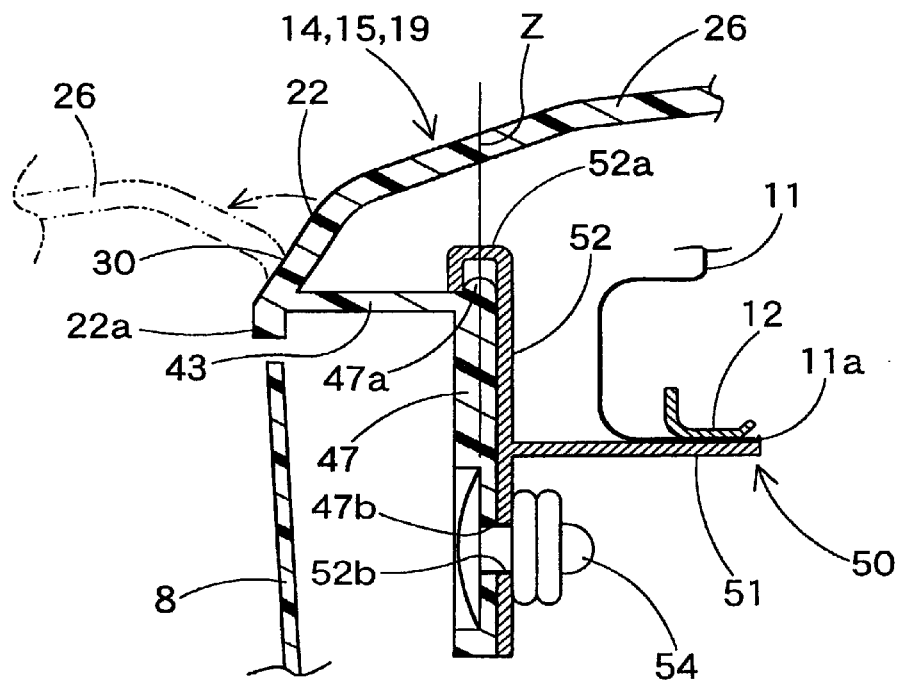
FIG. 6 is a schematic enlarged sectional view showing the hinge of the left door of the pad of the first embodiment.

As shown in FIGS. 3 and 4, the airbag apparatus 10 includes an airbag 11, an inflator 13, a pad 14, a bag holder 50, a horn switch mechanism 57 and a support plate 59. The airbag 11 is folded such that it can be expanded. The inflator 13 supplies expansion gas to the airbag 11. The pad 14 covers the folded airbag 11. The bag holder 50 holds the airbag 11, the inflator 13 and the pad 14. The support plate 59 connects the airbag apparatus 10 to the steering wheel body 1 and supports the airbag apparatus 10.

Figure 10:
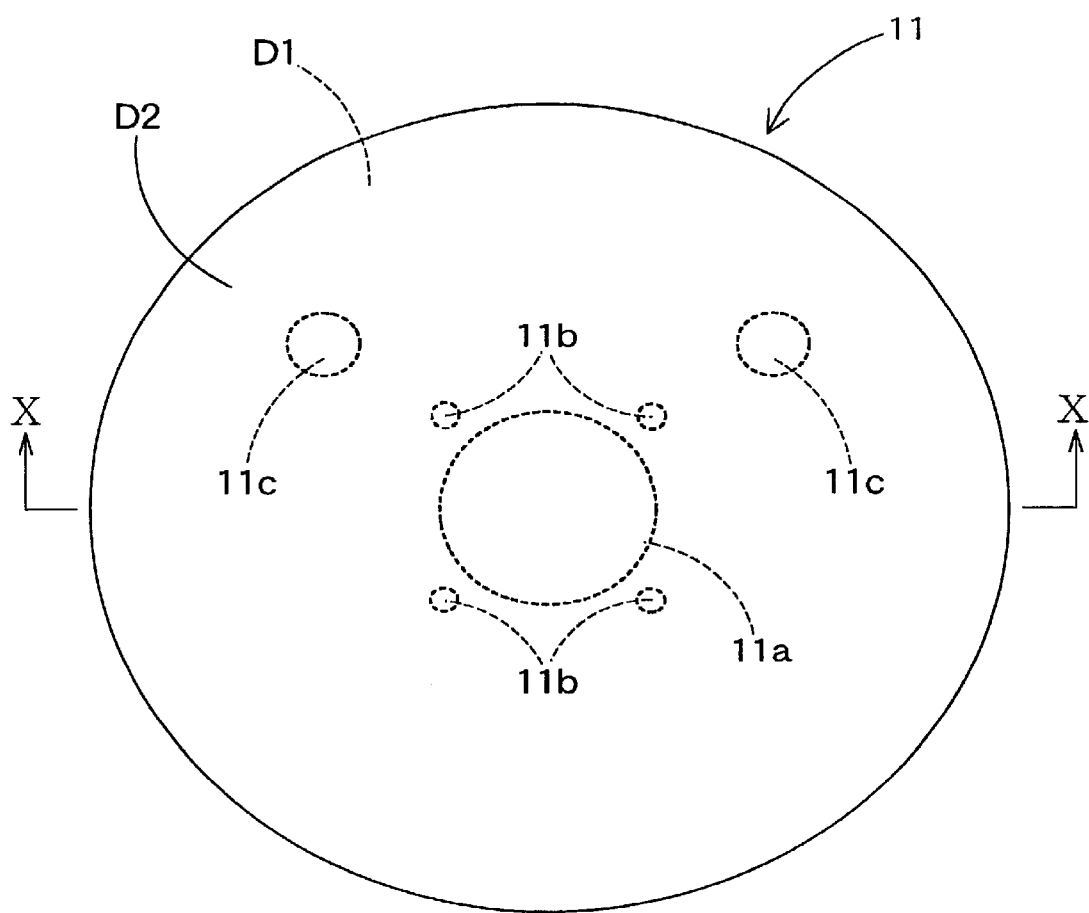
FIG. 10A is a plan view showing a state in which the airbag of the first embodiment is developed flatly.
FIG. 10B is a sectional view taken along a line X—X in FIG. 10A.
Figure 10:
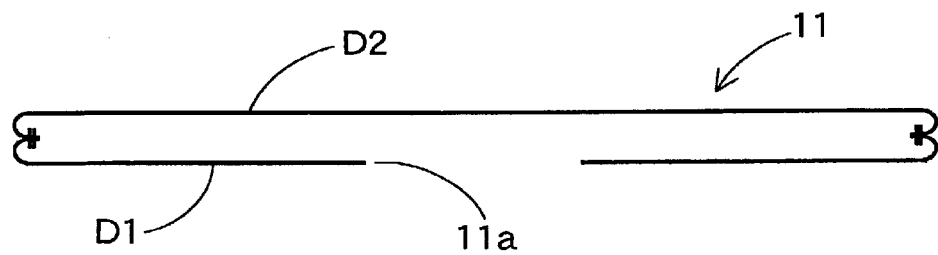

As shown in FIGS. 2 to 4, 10A and 10B, the airbag 11 has an opening ha through which the expansion gas flows. A cross section of the airbag 11 at the time of expansion is of substantially ellipse spherical shape. In the case of this embodiment, as shown in FIGS. 10A and 10B, the airbag 11 is a flat airbag using two cloths D1 and D2. That is, the airbag 11 is formed by flatting and superposing the cloths D1 and D2 on each other and by connecting the outer peripheries of the cloths D1 and D2 with each other by sewing or the like. Each of the cloths D1 and D2 is formed by cutting a weave such as polyamide string, polyester string or the like into a circular shape. The opening 11a is formed at its periphery with a plurality of mounting holes 11b. A bolt 12a of a retainer 12 is inserted through each of the mounting holes 11b. The retainer 12 is for holding the airbag 11 on the bag holder 50, and is substantially annular in shape. Vent holes 11c and 11c are formed at portions of the airbag 11 away from the opening 11a.

The inflator 13 includes a body 13a and a flange 13c. The body 13a is substantially columnar in shape, and is provided at its upper portion with a gas discharge port 13b. The flange 13c projects from an outer peripheral surface of the body 13a.

The pad 14 is made of synthetic resin such as polyolefin, or polyethylene thermoplastic elastomer, and is formed by injection forming or the like. As shown in FIGS. 1 to 7, the pad 14 includes a ceiling wall 15 and a side wall 40. The ceiling wall 15 ruptures a predetermined portion when the airbag 11 expands. The side wall 40 is substantially hexagonal cylindrical shape, and extends downward from an outer periphery of the ceiling wall 15.

Figure 7:
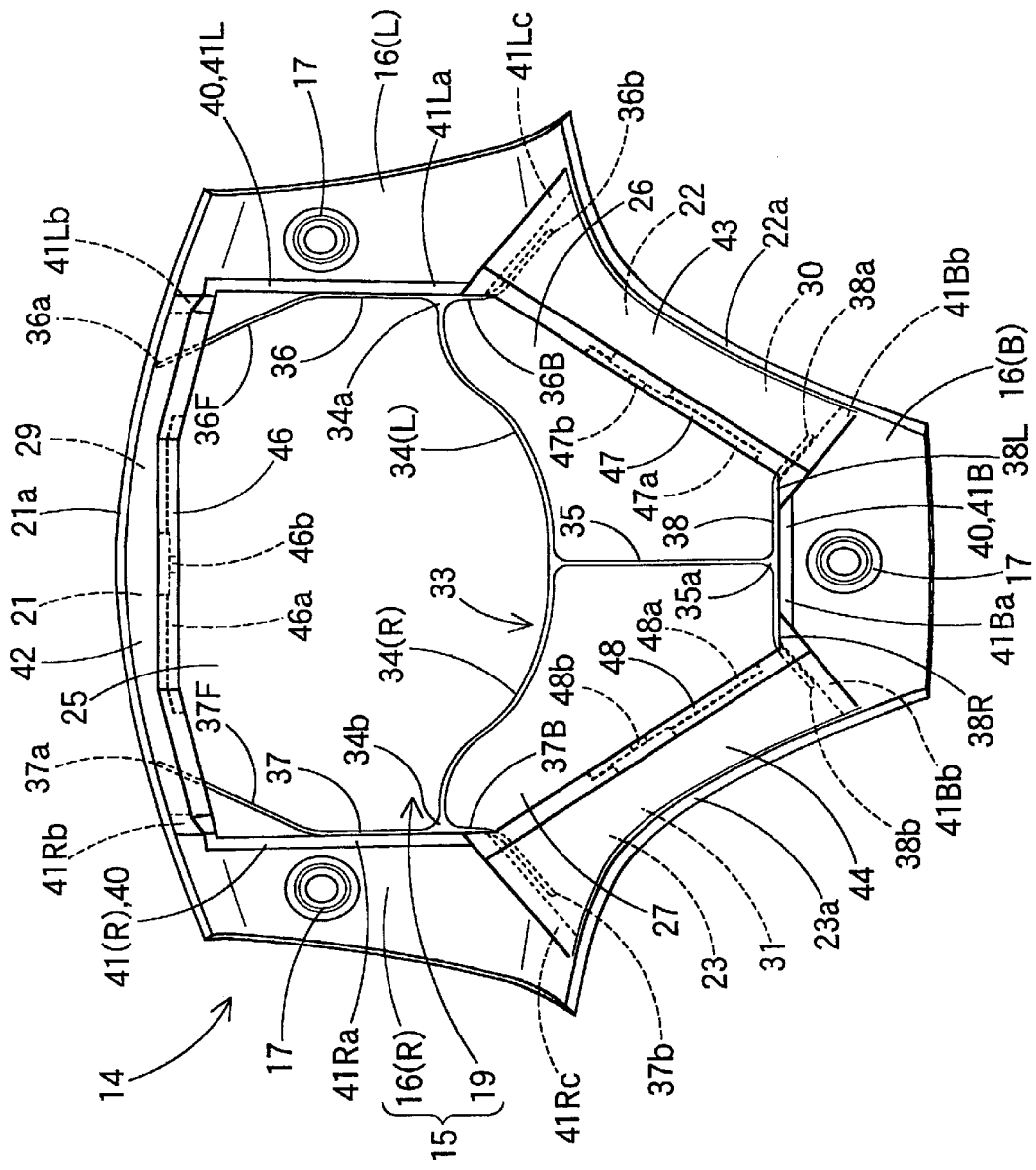
FIG. 7 is a bottom view of the pad of the first embodiment.
Figure 8:
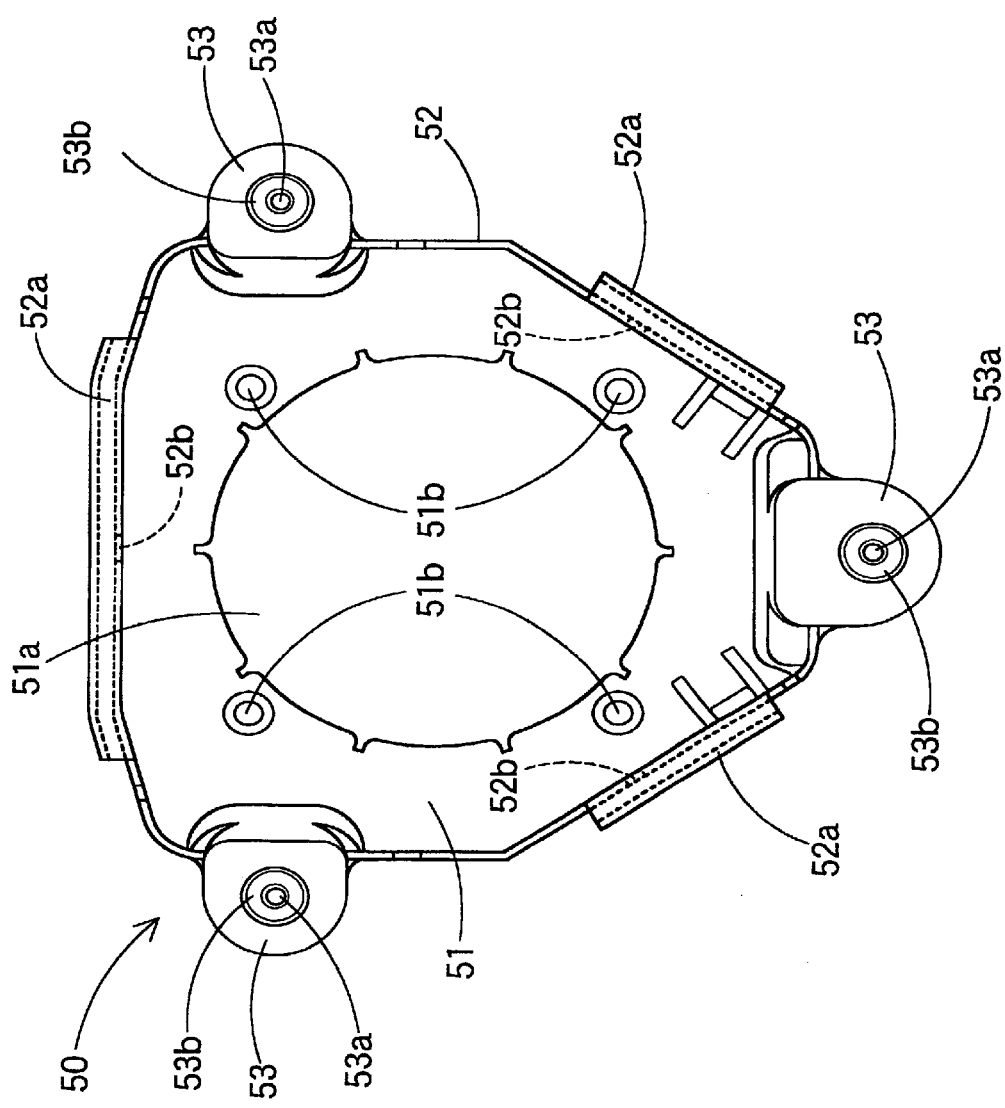
FIG. 8 is a plan view of a bag holder used for an airbag apparatus of the first embodiment.

The side wall 40 includes a general portion 41, holding walls 46, 47 and 48. The general portion 41 extends downward directly from a lower surface of the ceiling wall 15. As shown in FIG. 7, the general portion 41 comprises a left general portion 41L and a right general portion 41R and a rear general portion 41B (FIG. 7 is a bottom view of the pad 14, and left and right sides are reversed).

The left general portion 41L extends from a left front edge of the ceiling wall 15 toward a center of the left edge. The left general portion 41L is provided at its front end and rear end with connecting portions 41Lb and 41Lc, respectively. The front end connecting portion 41Lb is connected to a front lateral plate 42. The rear end connecting portion 41Lc is connected to a left lateral plate 43. A portion between the connecting portions 41Lb and 41Lc is a body portion 41La. The body portion 41La is exposed toward lower side of the pad 14. The right general portion 41R is disposed such as to extend from the right front edge of the ceiling wall 15 toward a center portion of the right edge. The right general portion 41R is provided at its front end and rear end with connecting portions 41Rb and 41Rc. The front end connecting portion 41Rb is connected to a front lateral plate 42. The rear end connecting portion 41Rc is connected to a right lateral plate 44. A portion between the connecting portions 41Rb and 41Rc is a body portion 41Ra, the body portion 41Ra exposed at a lower portion of the pad 14. The rear general portion 41B is disposed such as to extend laterally at a rear edge of the ceiling wall 15. The rear general portion 41B is provided at its left and right opposite ends with connecting portions 41Bb and 41Bb. The connecting portions 41Bb and 41Bb are respectively connected to left and right lateral plates 43 and 44. A portion between the connecting portions 41Bb and 41Bb is a body portion 41Ba, and the body portion 41Ba is exposed to a lower portion of the pad 14.

The front lateral plate 42 extends inwardly and laterally from a lower end 21a of a later-described front outer periphery 21 of the ceiling wall 15. The front lateral plate 42 is disposed such as to connect lower ends of the connecting portions 41Lb and 41Rb of the left general portion 41L and the right general portion 41R with each other. The left lateral plate 43 extends inwardly and laterally from a lower end 22a of a later-described left outer periphery 22 of the ceiling wall 15. The left lateral plate 43 is disposed such as to connect lower ends of the connecting portions 41Lc and 41Bb of the left general portion 41L and the rear general portion 41B with each other. The right lateral plate 44 extends inwardly and laterally from a lower end 23a of a later-described right outer periphery 23 of the ceiling wall 15. The right lateral plate 44 is disposed such as to connect lower ends of the connecting portion 41Rc and 41Bb of the right general portion 41R and the rear general portion 41B with each other.

A front holding wall 46 extends downwardly from a rear edge of the front lateral plate 42. A left holding wall 47 extends downwardly from an inner edge of a left lateral plate 43. A right holding wall 48 extends downward from an inner edge of the right lateral plate 44. These front, left and right holding walls 46, 47 and 48 are respectively disposed near hinges 29, 30 and 31 of doors 25, 26 and 27. These front, left and right holding walls 46, 47 and 48 are portions held by bag holder 50. The front, left and right holding walls 46, 47 and 48 respectively includes mounting holes 46b, 47b, and 48b and retaining portions 46a, 47a, and 48a. The mounting holes 46b, 47b, and 48b pass through horizontally and provided with steps. A rivet 54 passes through the mounting holes 46b, 47b, and 48b. The rivet 54 fixes the front, left and right holding walls 46, 47, and 48 to a later-described side wall 52. The retaining portions 46a, 47a, 48a are of projecting and are disposed on upper ends of the front, left and right holding walls 46, 47, and 48. Later-described retaining pawls 52a of the bag holder 50 are retained to the retaining portions 46a, 47a, 48a.

The ceiling wall 15 is disposed such as to cover an upper portion of the boss B between the covering layers 7 of the spokes SL, SR, and SB. Portions 21, 22, and 23 (front outer periphery 21, left outer periphery 22 and right outer periphery 23) adjacent to spaces AF, AL, and AR between the spokes SL, SR, and SB are disposed on an outer periphery of an upper surface of the ceiling wait 15. These front outer periphery 21, left outer periphery 22 and right outer periphery 23 are downwardly curved. An opening forming portion 19 is formed in a portion of the ceiling wall 15 which portion is surrounded by the general portions 41L, 41R, and 41B of the side wall 40. The opening forming portion 19 forms one opening through which the airbag 11 at the time of expansion can project. Three spoke side extending portions 16 (16L, 16R, and 16B) are formed around the opening forming portion 19. The spoke side extending portions 16L, 16R, and 16B are disposed such as to smoothly connect the covering layers 7 of the spokes SL, SR, and SB. A substantially cylindrical pushing portion 17 is disposed on lower surfaces of the spoke side extending portions 16L, 16R, and 16B. The pushing portion 17 abuts against a mounting piece 53 of the bag holder 50 that is positioned upwardly of the horn switch mechanism 57 so as to push the mounting piece 53. Three doors, i.e., a front door 25, a left door 26 and a right door 27 are disposed in the opening forming portion 19. A thin to-be ruptured portion 33, or breakable portion, that can be ruptured is disposed around these doors 25, 26 and 27.

The to-be ruptured portion 33 is disposed at a position adjacent to the doors 25, 26 and 27, and is of substantially T-shape as viewed from above. That is, the to-be ruptured portion 33 has a lateral line portion 34 and a longitudinal line portion 35. The lateral line portion 34 is disposed laterally. That is, the lateral line portion 34 is disposed in the right-left direction. The longitudinal line portion 35 extends rearward from substantially center of the lateral line portion 34. The lateral line portion 34 is disposed such as to laterally cross substantially central portion of the pad 14 in the longitudinal direction. A central portion of the lateral line portion 34 in the right-left direction is recess rearward as viewed from above such as to bypass a decorative portion 15a. The decorative portion 15a is ellipse in shape as viewed from above, and is disposed at a center of the ceiling wall 15. Portions of the lateral line portion 34 closer to left and right opposite ends 34a and 34b are disposed toward the left and right spokes SL, SR. The left and right spokes SL, SR extend in the right-left direction in the front side of the steering wheel W1. A portion of the longitudinal line portion 35 closer to its rear end 35a is disposed toward the disposition direction of the rear spoke SB. The to-be ruptured portion 33 includes left and right extending portions 36, 37 and a rear extending portion 38. The left and right extending portions 36 and 37 extend in opposite sides in the longitudinal direction (the front-rear direction) from left and right opposite ends 34a, 34b of the lateral line portion 34. The rear extending portion 38 extends in opposite sides in the lateral direction from the rear end 35a of the longitudinal line portion 35.

The left and right extending portions 36, 37 are disposed inside the left and right general portions 41L, 41R of the side wall 40. The left and right extending portions 36, 37 are disposed substantially along the general portions 41L, 41R such as to be in contact with the general portions 41L, 41R. A front end 36a of the left extending portion 36 extends toward a lower end 21a of the front outer periphery 21 of the ceiling wall 15 such as be hidden on the left edge side of the front lateral plate 42 as viewed from below of the pad 14. A rear end 36b of the left extending portion 36 extends toward a lower end 22a of the left outer periphery 22 of the ceiling wall 15 such as to be hidden by a front edge of the left lateral plate 43 as viewed from below of the pad 14. Similarly, a front end 37a of the right extending portion 37 extends toward a lower end 21a of a front outer periphery 21 of the ceiling wall 15 such as to be hidden by a right edge of the front lateral plate 42 as viewed from below of the pad 14. Further, a rear end 37b of the right extending portion 37 extends toward a lower end 23a of the right outer periphery 23 of the ceiling wall 15 such as to be hidden by a front edge of the right lateral plate 44 as viewed from below of the pad 14.

The rear extending portion 38 is disposed inside the rear general portion 41B of the side wall 40. The rear extending portion 38 is disposed along the general portion 41B such as to be in contact with the general portion 41B. A left end 38a of the rear extending portion 38 extends toward a lower end 22a of the left outer periphery 22 of the ceiling wall 15 such as to be hidden by the rear edge of the left lateral plate 43 as viewed from below of the pad 14. A right end 38b of the rear extending portion 38 extends toward the lower end 23a of the right outer periphery 23 of the ceiling wall 15 such as to be hidden by the rear edge of the right lateral plate 44 as viewed from below of the pad 14.

In the front door 25, the hinge 29 when the door is opened is disposed in the vicinity of the space AF. The space AF is a space between the left spoke SL and right spoke SR. The hinge 29 is a substantially straight portion connecting the front ends 36a and 37a of the left and right extending portions 36 and 37. The front door 25 is formed by a portion inside the lateral line portion 34 of the to-be ruptured portion 33, and the portions 36F, 37F. The portions 36F, 37F are portions in front of an intersection of the lateral line portion 34 in the left and right extending portions 36 and 37. The front door 25 is accommodated in the front space AF when the door 25 is opened around the hinge 29 as rotation center.

The hinge 30 of the left door 26 is disposed in the vicinity of the space AL. The space AL is a space between the left spoke SL and the rear spoke SB. The hinge 30 is a substantially straight portion connecting the rear end 36b of the left extending portion 36 and the left end 38a of the rear extending portion 38. The left door 26 is formed by a portion inside of the hinge 30, the portion 34L, the longitudinal line portion 35, the portion 36B and the portion 38L. The portion 34L is a portion on the left side of the intersection between the portion 34 and the longitudinal line portion 35 in the lateral line portion 34 of the to-be ruptured portion 33. The portion 36B is a portion behind the intersection of the portion 36 and the lateral line portion 34 of the left extending portion 36. The portion 38L is a portion on the left side of the intersection of the portion 38 and the longitudinal line portion 35 of the rear extending portion 38. When the left door 26 is opened around the hinge 30 as a rotation center, the left door 26 is accommodated in the left space AL.

The right door 27 is laterally symmetric to the left door 26. The hinge 31 when the right door 27 is opened is disposed in the vicinity of the space AR. The space AR is a space portion between the right spoke SR and the rear spoke SB. The hinge 31 is a substantially straight portion connecting the rear end 37b of the right extending portion 37 and the right end 38b of the rear extending portion 38. The right door 27 is formed by a portion inside the hinge 31, the portion 34R, the longitudinal line portion 35, the portions 37B and 38R. The portion 34R is a portion on the right side of the intersection between the portion 34 and the longitudinal line portion 35 in the lateral line portion 34 of the to-be ruptured portion 33. The portion 37B is a portion behind the intersection between the portion 37 and the lateral line portion 34 of the right extending portion 37. The portion 38R is a portion on the right side of the intersection between the portion 38 and the longitudinal line portion 35 of the rear extending portion 38. When the right door 27 is opened around the hinge 31 as a rotation center, the right door 27 is accommodated in the right space AR.

The bag holder 50 is die cast made of magnesium or the like for reducing weight and keeping shape. As shown in FIGS. 2 to 6 and 8, the bag holder 50 includes a lateral plate 51 and a side wall 52. The lateral plate 51 includes an insertion hole 51a through which the inflator body 13a can be centrally inserted from below. The side wall 52 extends vertically from substantially entire circumference of the outer periphery of the lateral plate 51. A periphery of a the insertion hole 51a of the lateral plate 51 is formed with a through hole 51b through which the bolt 12a of the retainer 12 is inserted. The retainer 12 has a function for holding the airbag 11 to the bag holder 50 and for holding the inflator 13 to the bag holder 50.

The side wall 52 abuts against an inner surfaces of the front, left and right holding walls 46, 47 and 48. The side wall 52 is provided with a plurality of (three, in the embodiment) retaining pawls 52a at the top ends of portions thereof which portions abuts against the inner surface of the front, left and right holding walls 46, 47 and 48. The retaining pawls 52a are retained to retaining portions 46a, 47a, 48a of the front, left and right holding walls 46, 47 and 48 from above. Each of the retaining pawls 52a in the side wall 52 is formed at its lower portion with a mounting hole 52b (see FIGS. 5, 6 and 8). The mounting holes 52 are disposed at positions corresponding to the mounting holes 46b, 47b, 48b of the front, left and right holding walls 46, 47 and 48. The rivet 54 passes through each mounting hole 52b. The rivets 54 mount the retaining portions 46a, 47a, 48a to the side wall 52.

Three mounting pieces 53 are formed at upper ends portions near the spokes SL, SR and SB in the side wall 52 such as to extend outwardly in the horizontal direction. A horn switch mechanism 57 is disposed between the mounting pieces 53 and a mounting piece 62 of the support plate 59. The mounting piece 62 is disposed below the mounting pieces 53. A nut 53b is embedded in each of the mounting pieces 53. The nut 53b includes a screw hole 53a. A stepped bolt 57d of the horn switch mechanism 57 is threadedly engaged with the screw hole 53a.

A lead wire (not shown) is connected to the bag holder 50 such as to bring the bag holder 50 into conduction with a positive pole of a horn operating circuit.

The annular retainer 12 is used for holding the airbag 11 and the inflator 13 by the bag holder 50. The retainer 12 is disposed in the airbag 11. The retainer 12 includes a plurality of bolts 12a. These bolts 12a pass through the through hole 51b of the bag holder 50 and the flange 13c of the inflator 13, and nuts 12b are threadedly engaged with the bolts 12a so that the airbag 11 and the inflator 13 are held by the bag holder 50. The rivet 54 and the retaining pawls 52a are used for holding the pad 14 by the bag holder 50. That is, the rivets 54 mount the front, left and right holding walls 46, 47 and 48 of the pad side wall 40 to the side wall 52, and the retaining pawls 52a retain the retaining portions 46a, 47a, 48a of the front, left and right holding walls 46, 47 and 48, so that the pad 14 is held by the bag holder 50.

As shown in FIGS. 3 and 4, three horn switch mechanisms 57 are disposed on a back surfaces of the spoke side extending portions 16L, 16R, 16B in the pad 14. The spoke side extending portions 16L, 16R, 16B are disposed near the spokes SL, SR, SB. Each of the horn switch mechanisms 57 is disposed between each mounting piece 53 of the bag holder 50 and each mounting piece 62 of the support plate 59. Each horn switch mechanism 57 brings contacts 57a and 57b by pushing the pad 14 down, thereby operates a horn. Each horn switch mechanism 57 separates the contacts 57a and 57b from each other by a coil spring 57c when the horn is not operated. Further, the horn switch mechanism 57 keeps a separating distance between the contacts 57a and 57b constantly by means of the stepped bolt 57d. The stepped bolt 57d is threadedly engaged from below of the mounting piece 62 of the support plate 59 with the screw hole 53a of the mounting piece 53 in the bag holder 50.

Figure 9:
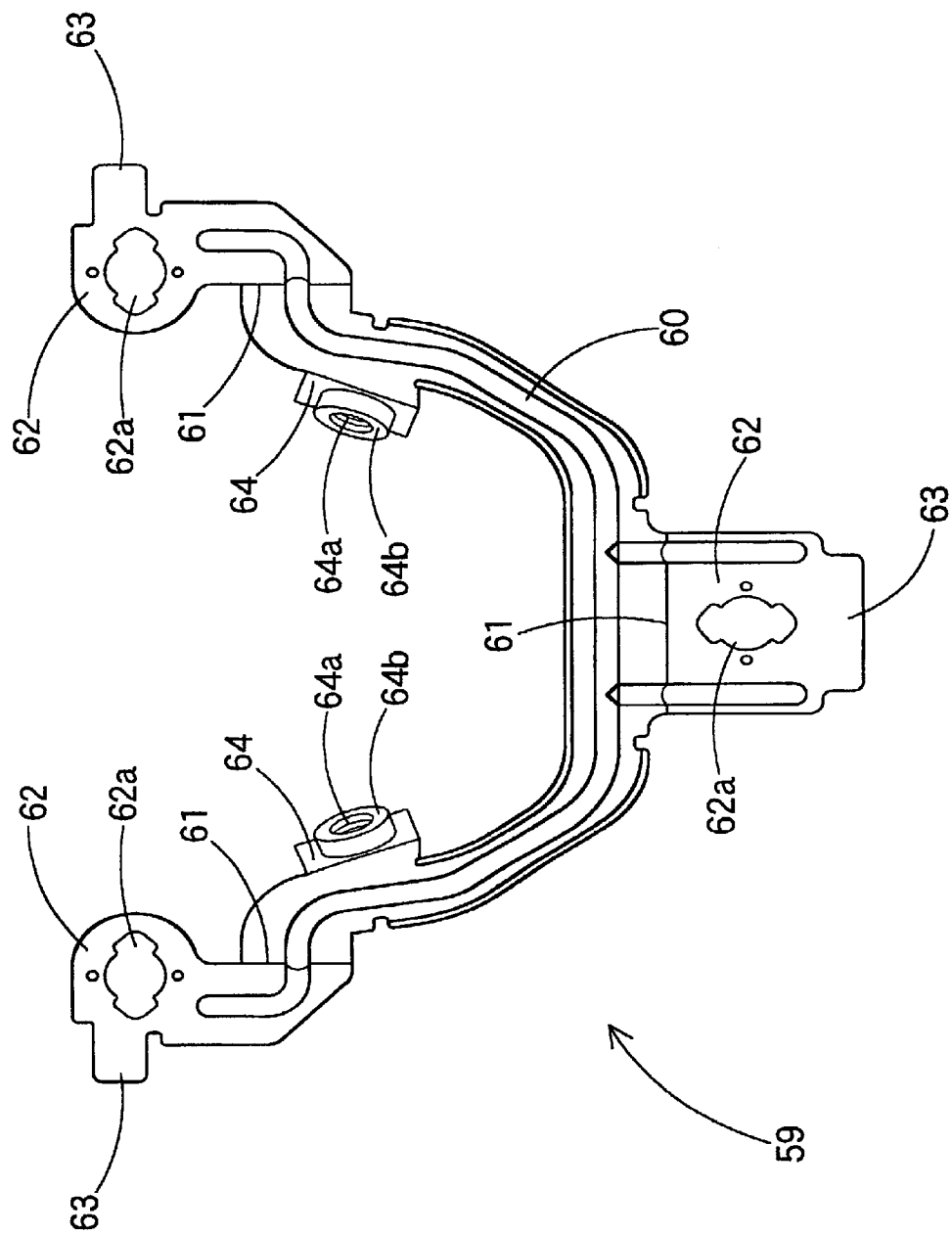
FIG. 9 is a plan view of a support plate used for the airbag apparatus of the first embodiment.

As shown in FIGS. 3, 4 and 9, the support plate 59 is made of plate metal, and includes a connecting rod 60, three vertical plates 61, three mounting pieces 62 and two connecting pieces 64. The connecting rod 60 is of U-shape as viewed from above. Each of the vertical plates 61 extends upwardly from a position near the mounting piece 53 of the bag holder 50 in the connecting rod 60. The mounting pieces 62 extend outwardly in the horizontal direction from upper ends of the vertical plates 61, and are disposed below the mounting pieces 53. The connecting pieces 64 extend downwardly from inner edges of left and right sides of the connecting rod 60.

Each of the mounting pieces 62 is formed at its central portion with a mounting hole 62a. An opening shape of the mounting hole 62a is a combination of a circle hole and substantially right triangular hole disposed at a symmetric position of the circle hole. A stepped bolt 57d of the horn switch mechanism 57 is inserted through the mounting hole 62a. An outer edge of each mounting piece 62 is formed with an abutting piece 63. The abutting piece 63 abuts against the covering layer 7 of the spokes SL, SR, and SB and supported.

A nut 64b is fixed to each of opposed surfaces of each of the connecting pieces 64. A bolt 9 is threadedly engaged with the nut 64b. The bolt 9 mounts the airbag apparatus 10 to each mounting seat 5c of the spoke core 5.

Figure 2:
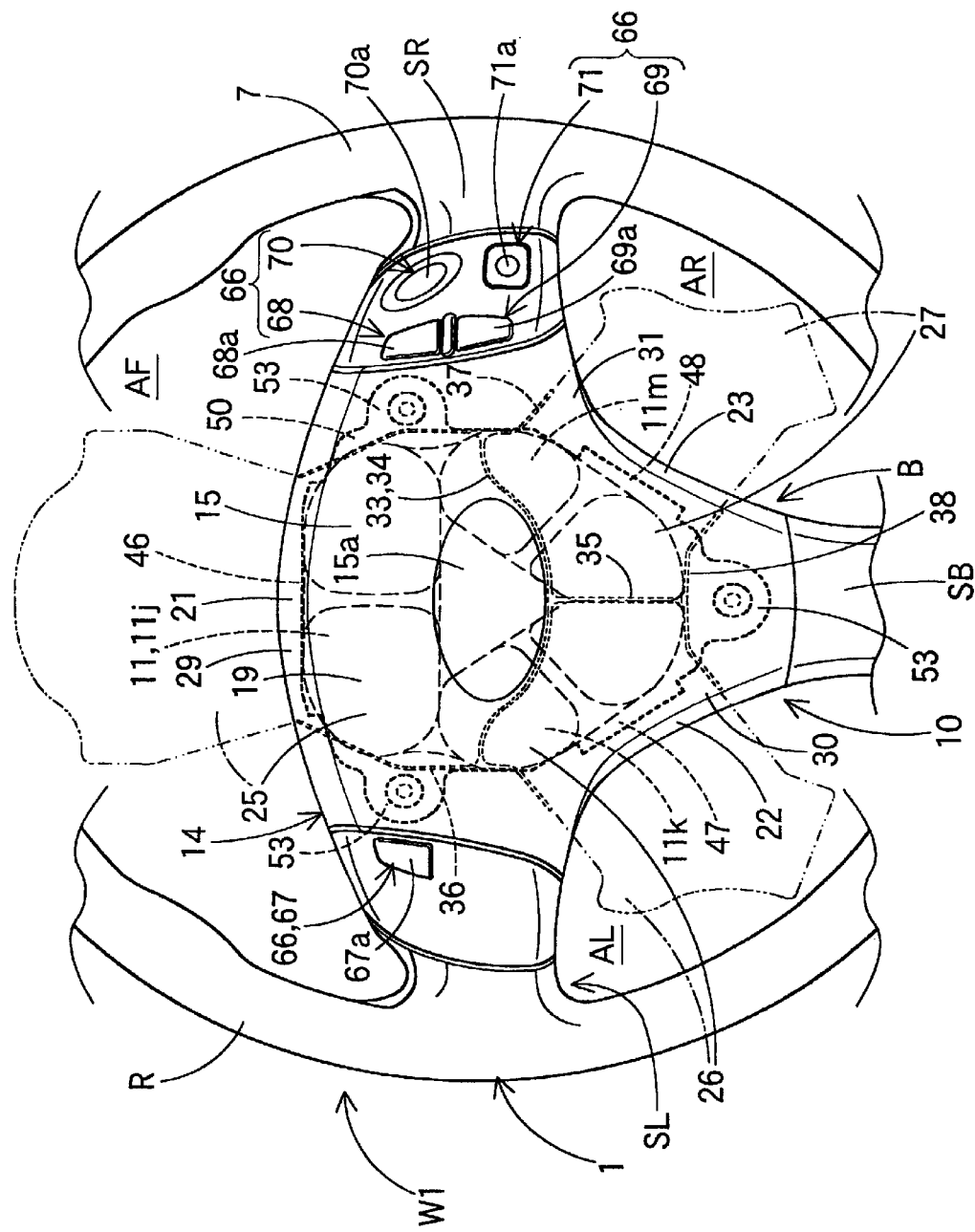
FIG. 2 is a partial plan view of the steering wheel of the first embodiment, and is a plan view showing a folded state of the bag holder and the airbag.

As shown in FIGS. 1 and 2, the switch operating portion 66 is disposed such as not to be covered by the doors 25, 26, and 27 when it is opened. In the case of this embodiment, the switch operating portion 66 is disposed on the upper surfaces of the left and right spokes SL, SR near the left and right spoke side extending portions 16L, 16R of the pad 14. In the case of this embodiment, an operation button 67 for the audio equipment, a shift up button 68 of a shift change, a shift down button 69, an operation button 70 of a telephone and an operation lever 71 of a navigation system are disposed as the switch operating portion 66. The operation buttons 67 is disposed on the left spoke SL. Other buttons 68, 69, and 70 and the lever 71 are disposed on the right spoke SR. In these switch operating portions 66, operation surfaces 67a, 68a, 69a, 70a, and 71a disposed on the upper surface are disposed in the vicinity of a ring surface P so that they can be operated easily from above when the steering wheel W1 is steered.

When the steering wheel W1 of the first embodiment is mounted to the vehicle, the airbag apparatus 10 is previously assembled.

The airbag apparatus 10 is assembled in the following manner. First, the retainer 12 is inserted into the airbag 11, and each bolt 12a of the retainer 12 is projected from the mounting hole 11b. Then, the airbag 11 is folded. The airbag 11 is folded in the following manner. Three folding portions 11j, 11k, and 11m (see FIG. 2) are provided, the folding portions 11j, 11k, and 11m are folded such that they can be disposed below the doors 25, 26, 27. That is, they are folded such that pressing force for opening the doors 25, 26, and 27 can reliably be secured by the folding portions 11j, 11k, and 11m.

Figure 11:
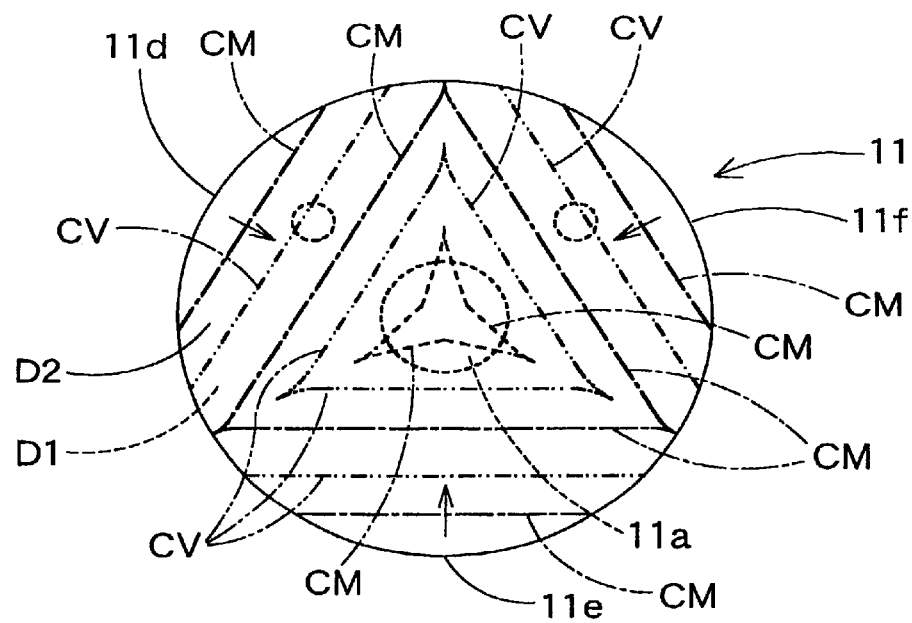
FIGS. 11A, 11B and 11C are views for explaining folding step of the airbag apparatus of the first embodiment.
Figure 11:
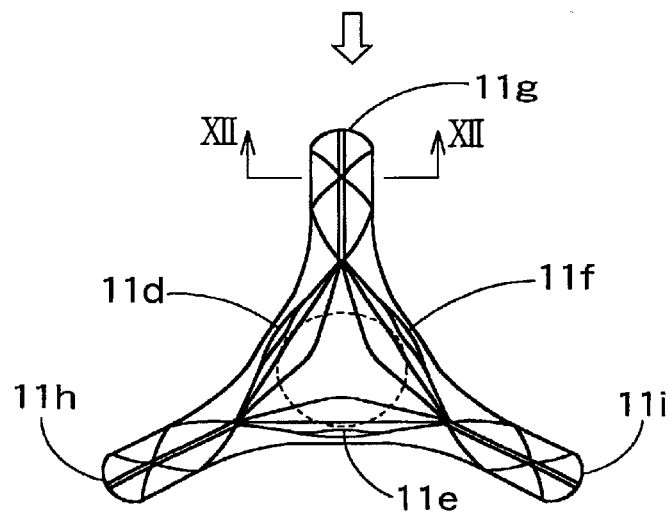
Figure 11:
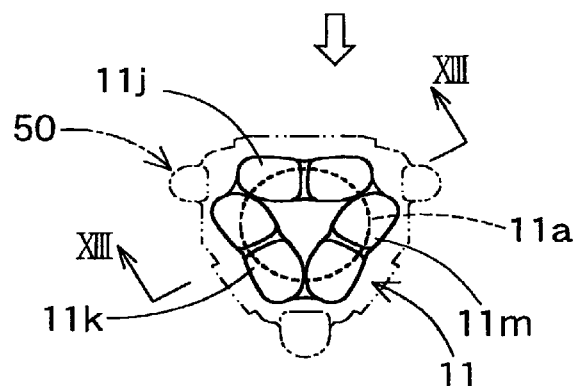

The folding step will be described in detail. As shown in FIG. 11A, the cloth D2 on the side of the driver opposed to the opening 11a is superposed on the cloth D1 on the side of the inflator 13, and the airbag 11 is developed flatly. Then, the cloth is folded in two stages.

Figure 12:
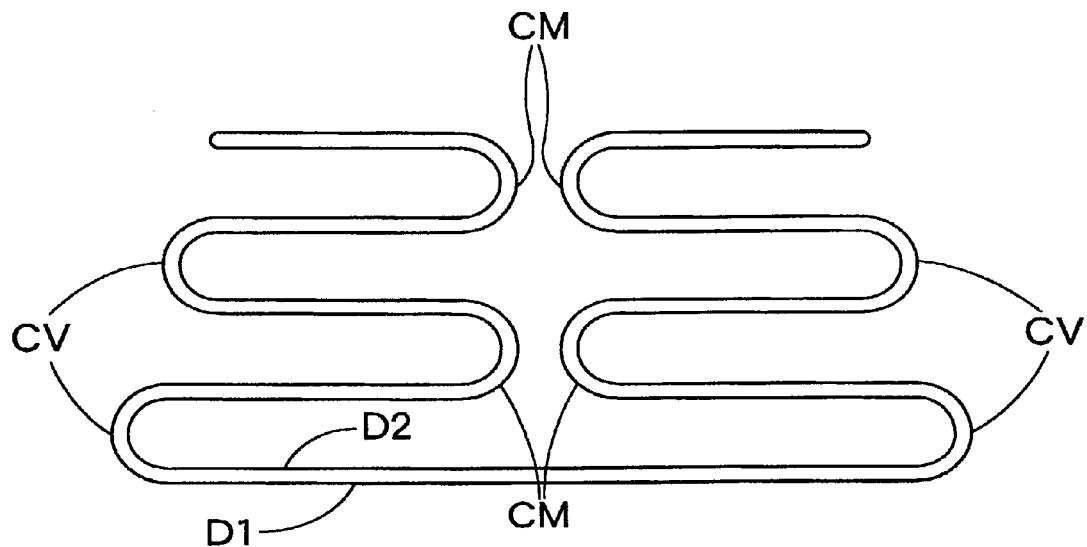
FIG. 12 is a sectional view taken along a line XII—XII in FIG. 11B.

In a first stage, as shown in FIGS. 11A, 11B, and 12, peripheries 11d, 11e, 11f are folded such as to approach the opening 11a. Each of the peripheries 11d, 11e, and 11f is located in three directions radially divided equally around the opening 11a. In the case of this embodiment, the peripheries 11d, 11e, and 11f are folded on the side of the cloth D2 opposed to the opening 11a in a form of a bellows for forming an upward crease CM and downward crease CV. After the cloths are folded, as shown in FIG. 11B, peripheries 11g, 11h, 11i on the side of folded end are disposed in three directions around the opening 11a.

Figure 13:
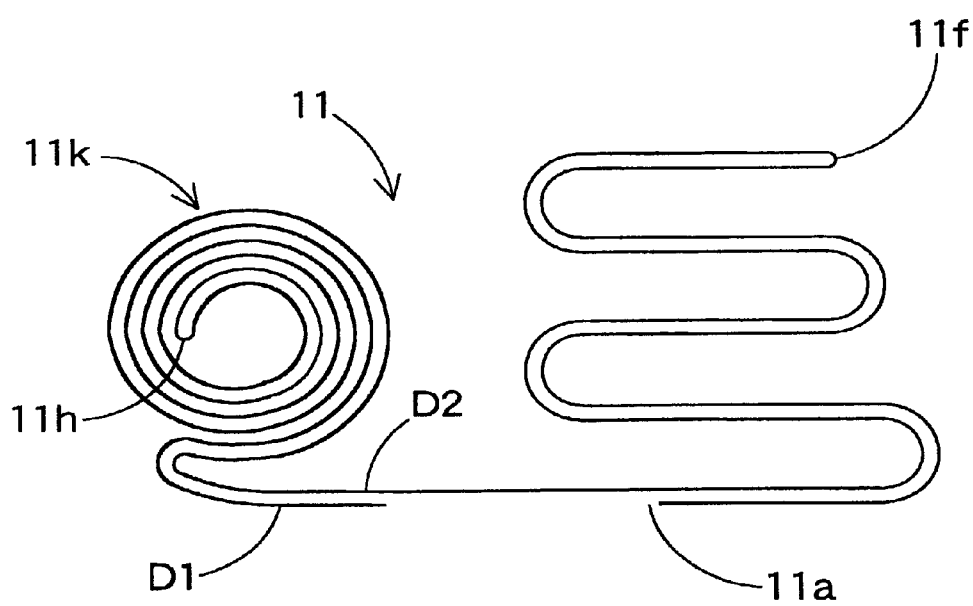
FIG. 13 is a sectional view taken along a line XIII—XIII in FIG. 11C.

In a second stage, as shown in FIGS. 11B, 11C, and 13, the peripheries 11g, 11h, and 11i are folded such as to approach the opening 11a to form the folding portions 11j, 11k, and 11m, thereby completing the folding operation of the airbag 11. In the case of this embodiment, the peripheries 11g, 11h, and 11i on the side of the folded end in the first stage are folded by outer roll folding. That is, the peripheries 11g, 11h, and 11i are wound on the side of the cloth D1 having the opening 11a. The wound portion is placed on the side of the cloth D2 opposed to the opening 11a and folded.

After the folding operation of the airbag 11 has been completed, in order to prevent the crease from being restored and eliminated, the airbag 11 may be wrapped by a thin wrapping bag that can be ruptured.

After the airbag 11 is folded, it is accommodated in the bag holder 50. In this step, each bolt 12a of the retainer 12 projecting from the airbag 11 is inserted through the through hole 51b of the bag holder lateral plate 51, and the airbag 11 is placed on the lateral plate 51 surrounded by the side wall 52 (see FIG. 11C).

At that time, three clots (folded portions) 11j, 11k, and 11m formed by folding in the second stage are disposed as follows. The clot 11j is disposed on the side of the front edge of the lateral plate 51, the clot 11k is disposed on the left side on the side of the rear edge of the lateral plate 51, the clot 11m is disposed on the right side on the side of the rear edge of the lateral plate 51, and the airbag 11 is placed on the lateral plate 51. The bent holes 11c, 11c are disposed on the portion of the clot 11j.

Then, the body 13a of the inflator 13 is inserted through the insertion hole 51a of the bag holder lateral plate 51, and the bolt 12a of the retainer 12 is inserted through the inflator flange 13c. The flange 13c of the inflator 13 is abutted against a lower surface of the lateral plate 51. The nut 12b is threadedly engaged with the bolt 12a projecting from the flange 13c, and the airbag 11, the bag holder 50 and the inflator 13 are integrally assembled.

Thereafter, the pad 14 is pushed down from above such as to surround the outer peripheral surface on the side of the folded airbag 11 by the side wall 40. Then, the retaining pawls 52a of the bag holder 50 are retained to the retaining portions 46a, 47a, and 48a of the front, left and right holding walls 46, 47, and 48. The mounting holes 46b, 47b, and 48b of the front, left and right holding walls 46, 47, and 48 are aligned to the mounting holes 52b of the bag holder 50. Then, the rivets 54 are inserted into the mounting holes 46b, 47b, 48b, and the front, left and right holding walls 46, 47, and 48 and the side wall 52 are fastened.

The horn switch mechanism 57 is disposed on each of the mounting pieces 62 of the support plate 59, and the portions of the horn switch mechanisms 57 are disposed on the lower surface of the mounting pieces 53 of the bag holder 50. Next, the stepped bolt 57d is threadedly engaged with the screw hole 53a, thereby assembling the airbag apparatus 10.

The lower cover 8 is mounted to the steering wheel core 2 utilizing a screw or the like, the switch operating portion 66 is disposed and the steering wheel body 1 is assembled. The steering wheel core 2 is produced by die casting and then, the covering layer 7 is formed. The boss 4a of the boss core 4 is fitted around the steering shaft 80 of the vehicle, the nut 81 is threadedly engaged, and the steering wheel body 1 is mounted to the steering shaft 80. The steering shaft 80 is inclined such that its upper end is directed upward through about 30° with respect to the horizontal direction along the ground.

Lead wires (not shown) extending from the horn switch mechanism 57 of the airbag apparatus 10 and the various switch operating portions 66 are connected to a connector (not shown) on the side of the steering wheel body 1. Further, each of the abutting pieces 63 of the support plate 59 of the airbag apparatus 10 is abutted and supported against the covering layer 7 of the spokes SL, SR, and SB, and the connecting pieces 64, 64 are abutted against the inner surface of the mounting seats 5c of the rear core 5a. Next, the mounting bolts 9 are threadedly engaged with the connecting holes 64a of the connecting pieces 64 from the hole 8a of the lower cover 8 through the mounting holes 5d of the mounting seats 5c. As a result, the steering wheel W1 can be assembled and the steering wheel W1 can be mounted to the steering shaft 80.

In the steering wheel W assembled in the above-described manner, a predetermined device is operated by pushing down or swinging the operation surfaces 67a, 68a, 69a, 70a, and 71a of the switch operating portions 66 (operation buttons 67, 70, the shift up button 68, the shift down button 69, and the operation lever 71).

If the inflator 13 is actuated, the expansion gas from the inflator 13 flows into the airbag 11. Then, the airbag 11 expands and the folding portions 11j, 11k, and 11m are developed to push up the three doors 25, 26 and 27 of the pad 14. Therefore, the doors 25, 26, and 27 of the pad 14 rupture the to-be ruptured portion 33 and opens around the hinges 29, 30, and 31 as rotation centers. As a result, the opening forming portion 19 largely opens, the airbag 11 projects from the pad 14 and expands into a predetermined shape.

When the airbag 11 is developed and expanded, the hinges 29, 30, and 31 of the doors 25, 26, and 27 are located near the spaces AF, AL, and AR between the spokes SL, SR, and SB. The hinges 29, 30, and 31 are disposed on the side of the lower ends 21a, 22a, and 23a of the pad outer peripheries 21, 22, and 23 lower than a portion Z (see FIGS. 3, 5, and 6). The portion Z is above the holding portions (front, left and right holding walls) 46, 47 and 48 by the bag holder 50 near the hinges 29, 30, and 31 in the pad 14 (ceiling wall 15). Therefore, the doors 25, 26, and 27 open around the hinges 29, 30, 31 located near the outer periphery lower ends 21a, 22a, and 23a of the pad 14. As a result, the doors 25, 26, and 27 can secure their own areas widely. The doors 25, 26, and 27 secure wide opening area and open as wide as possible.

When the doors 25, 26, and 27 open around the hinges 29, 30, and 31, the doors 25, 26, and 27 are disposed in the three spaces AL, AR, and AB between the spokes SL, SR, and SB. The switch operating portions 66 are disposed in areas of the spokes SL, SR that are not covered with the opened doors 25, 26, and 27. Therefore, the opened doors 25, 26, and 27 do not interfere with the switch operating portions 66 and disposed smoothly in the three spaces AF, AL, and AR. As a result, the doors 25, 26, and 27 can widely open and their states can be stably secured.

Therefore, according to the steering wheel W1 of the first embodiment, even if the switch operating portions 66 are disposed on the spokes SL, SR near the boss B, the doors 25, 26 and 27 of the pad 14 can widely open. According to the steering wheel W1 of the first embodiment, the airbag 11 at the initial expansion stage can widely develop. As a result, in a state in which the driver is close to the steering wheel W, even if the airbag 11 is developed and expanded, it is possible to prevent the airbag 11 from applying a partial pushing force to the driver.

In the pad 14 of the first embodiment, portions of the to-be ruptured portions 33 which are respectively adjacent to the doors 25, 26, and 27 are of substantially T-shape as viewed from above, and have the lateral line portion 34 and the longitudinal line portion 35. The lateral line portion 34 is disposed laterally. The longitudinal line portion 35 extends rearward from substantially central portion of the lateral line portion 34. Left and right opposite ends 34a, 34b of the lateral line portion 34 are directed to the front left and right spokes SL, SR. In the steering wheel W1 of the first embodiment of three spokes type, among the spaces AF, AL, and AR between the spokes SL, SR, and SB, the front space AF is set greater than rear left and right spaces AL, AR so that the measuring instruments of the instrument panel can easily be seen. Therefore, if the to-be ruptured portions 33 adjacent to the doors 25, 26 and 27 are substantially T in shape, the front door 25 in front of the lateral line portion 34 of the to-be ruptured portion 33 has a greater area. The left and right doors 26, 27 divided by the rear longitudinal line portion 35 that is behind the lateral line portion 34 have smaller area. As a result, shapes of the front, left and right doors 25, 26, and 27 can easily be fit to the front, left and right spaces AF, AL, and AR in which the doors are accommodated when they opened. That is, the shapes of the front, left and right doors 25, 26, and 27 can easily be set.

The pad 14 of the first embodiment has the ceiling wall 15 and the side wall 40. The ceiling wall 15 has the doors 25, 26 and 27 and the to-be ruptured portion 33 and is disposed on the side of the upper portion of the pad 14. The side wall 40 extends downward from the ceiling wall 15 and is disposed in the vertical direction such that the side wall 40 can be connected to the bag holder 50. Remaining portions 36, 37, and 38 of the to-be ruptured portion 33 except the adjacent portions 34, 35 which adjoin the doors 25, 26, and 27 approach the inner surfaces of the general portions 41L, 41R, and 41B of the side wall 40 in the ceiling wall 15 and are disposed substantially along the side wall general portions 41L, 41R, and 41B. The general portions 41L, 41R, and 41B of the side wall 40 are portions which increase the thickness of the ceiling wall 15. That is, the remaining portions 36, 37, and 38 of the to-be ruptured portion 33 approach the inner surface of the portion 41 which increases the thickness of the ceiling wall 15. Therefore, stress concentration is prone to be generated in the remaining portions 36, 37, and 38. Further, the remaining portions 36, 37, and 38 are disposed along the general portion 41 of the side wall 40. Therefore, the remaining portions 36, 37, and 38 rupture easily along the general portion 41. As a result, the to-be ruptured portion 33 easily ruptures and the doors 25, 26, and 27 smoothly open.

Figure 14:
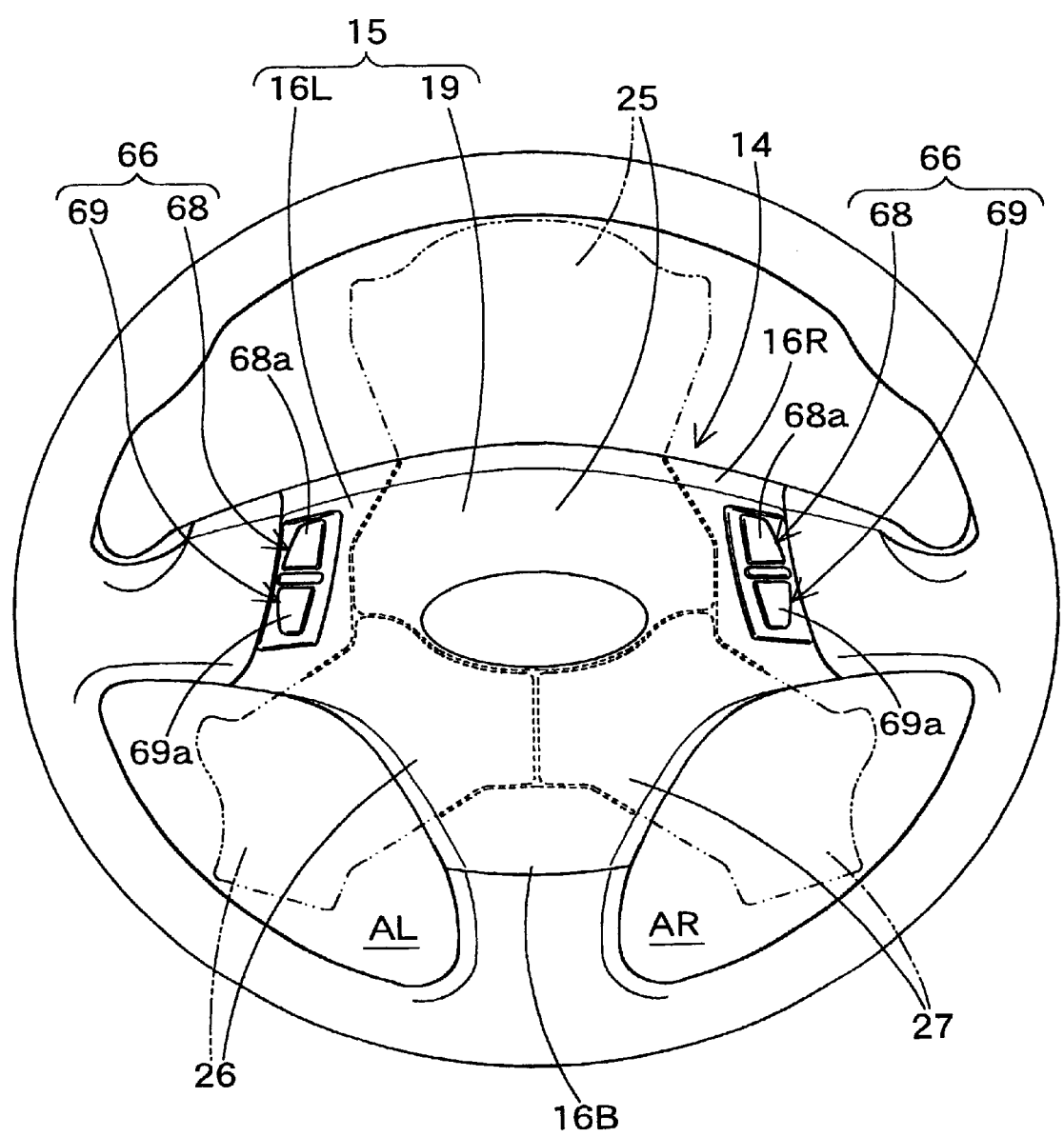
FIG. 14 shows a modification of the first embodiment, and is a plan view of the steering wheel in which a switch operating portion is disposed on another position.

In the first embodiment, the switch operating portions 66 are disposed on the portions of the spokes SL, SR on the side of the steering wheel body 1 not on the side of the pad 14. However, as shown in FIG. 14, the switch operating portions 66 may be disposed in an area which other than the portions of the doors 25, 26, and 27 and which are not covered by the opened doors 25, 26, and 27. That is, the switch operating portions 66 may be disposed on the portions 16L, 16R of the pad 14 or the spoke side extending portions 16B. Of course, the switch operating portions 66 may be disposed both the spokes S side and the pad 14 side only if they are not covered with the opened doors 25, 26, and 27. The switch operating portion may be disposed such as to project not only from the pad 14 but also from the lower cover 8, or from the boss B of the steering wheel body 1 toward the spaces AL, AR.

In the first embodiment, the pad 14 is held by the bag holder 50 by retaining the retaining pawls 52a to the retaining portions 46a, 47a, and 48a and by using the rivet 54. However, if the hinges 29, 30, and 31 of the doors 25, 26, and 27 are disposed near the spaces AF, AL, and AB between the spokes, and if the hinges 29, 30, and 31 are disposed on the side of the outer peripheries 21, 22, and 23 of the pad 14 which is lower than the portion Z located above the holding portions 46, 47, and 48 held by the bag holder 50 in the vicinity of the hinges 29, 30, and 31, the pad 14 may be held on the bag holder 50 only by the rivet 54. Alternatively, the pad 14 may be held as shown in FIGS. 15, 16, and 17.

Figure 15:
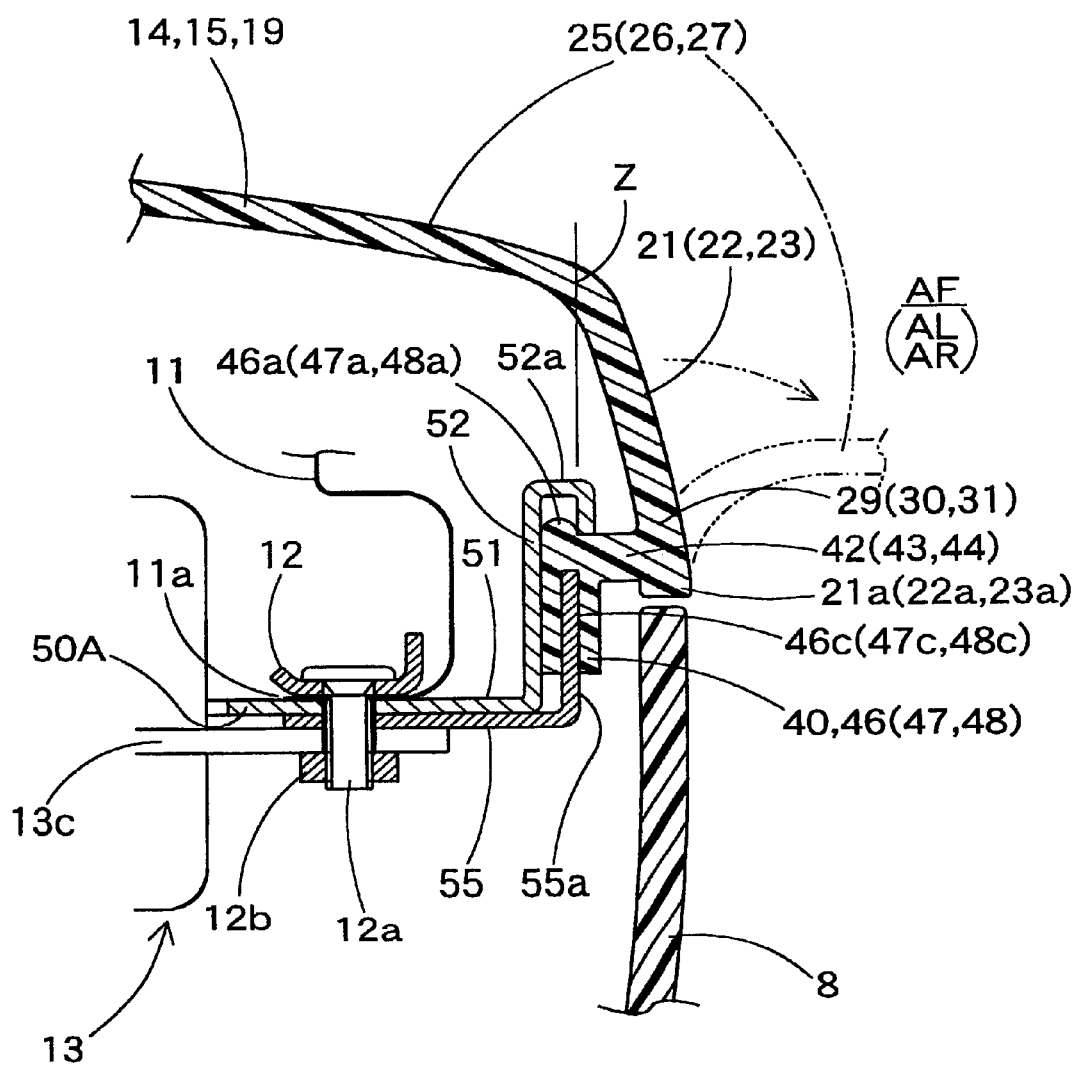
FIG. 15 shows another modification of the first embodiment, and shows a holding structure of the pad of the bag holder in the modification.

According to the holding structure shown in FIG. 15, a bag holder 50A holds the holding walls 46, 47, and 48 utilizing a metal auxiliary plate 55. The side wall 52 of the bag holder 50A is formed with a retaining pawl 52a. The retaining pawl 52a retains projecting retaining portions 46a, 47a, and 48a of the holding walls 46, 47, and 48. On the other hand, the auxiliary plate 55 is formed with an insertion piece 55a. Lower end surface of the holding walls 46, 47, and 48 are formed with insertion grooves 46c, 47c, and 48c through which the insertion piece 55a is inserted. The holding walls 46, 47, and 48 are sandwiched between the retaining pawls 52a of the bag holder 50A and the insertion piece 55a of the auxiliary plate 55, and held by the bag holder 50A. The auxiliary plate 55 is fastened to the lateral plate 51 of the bag holder 50A utilizing the bolt 12a and nut 12b of the retainer 12.

Figure 16:
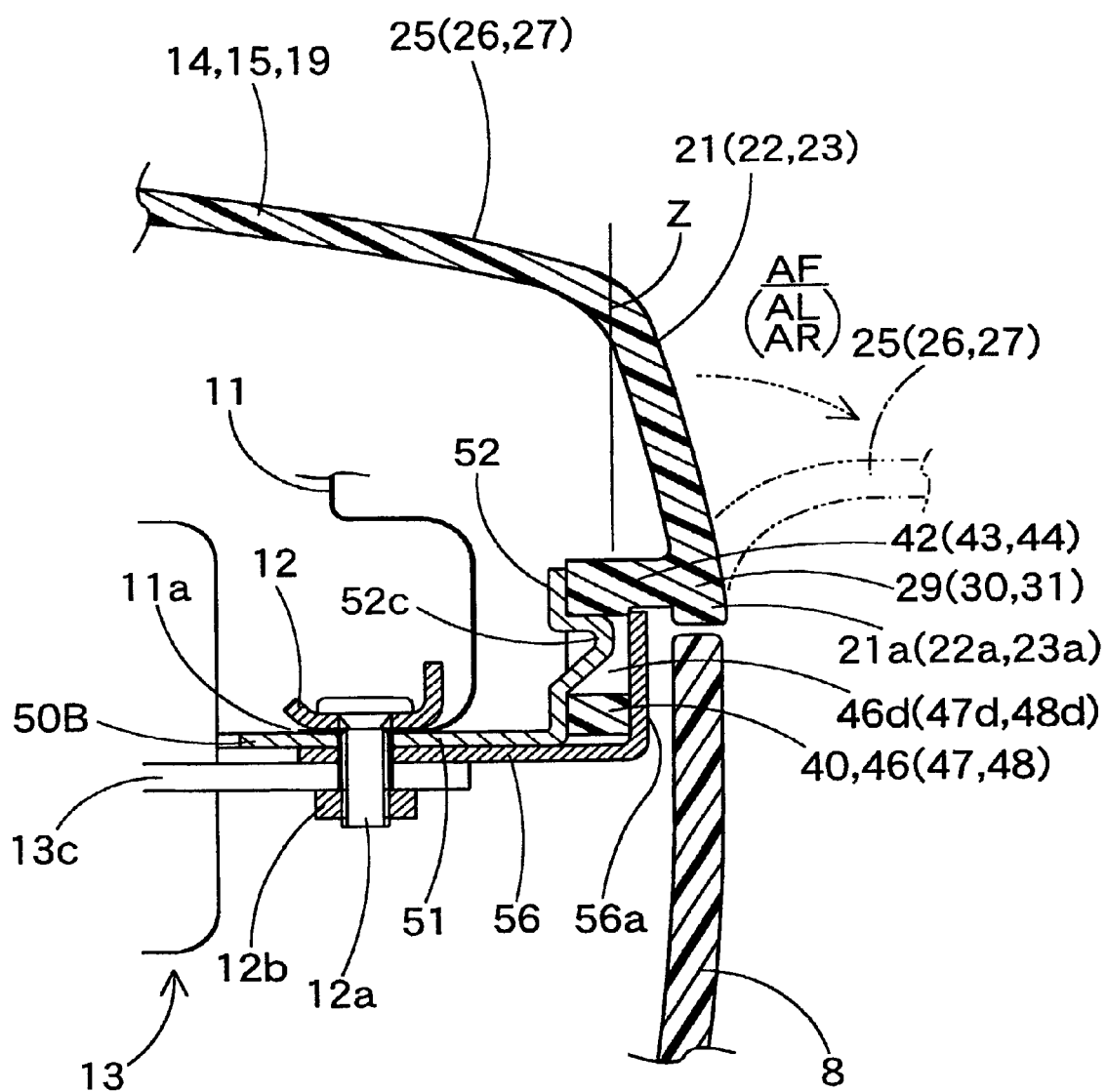
FIG. 16 shows another modification of the first embodiment, and shows a holding structure of the pad of the bag holder in the modification.
Figure 17:
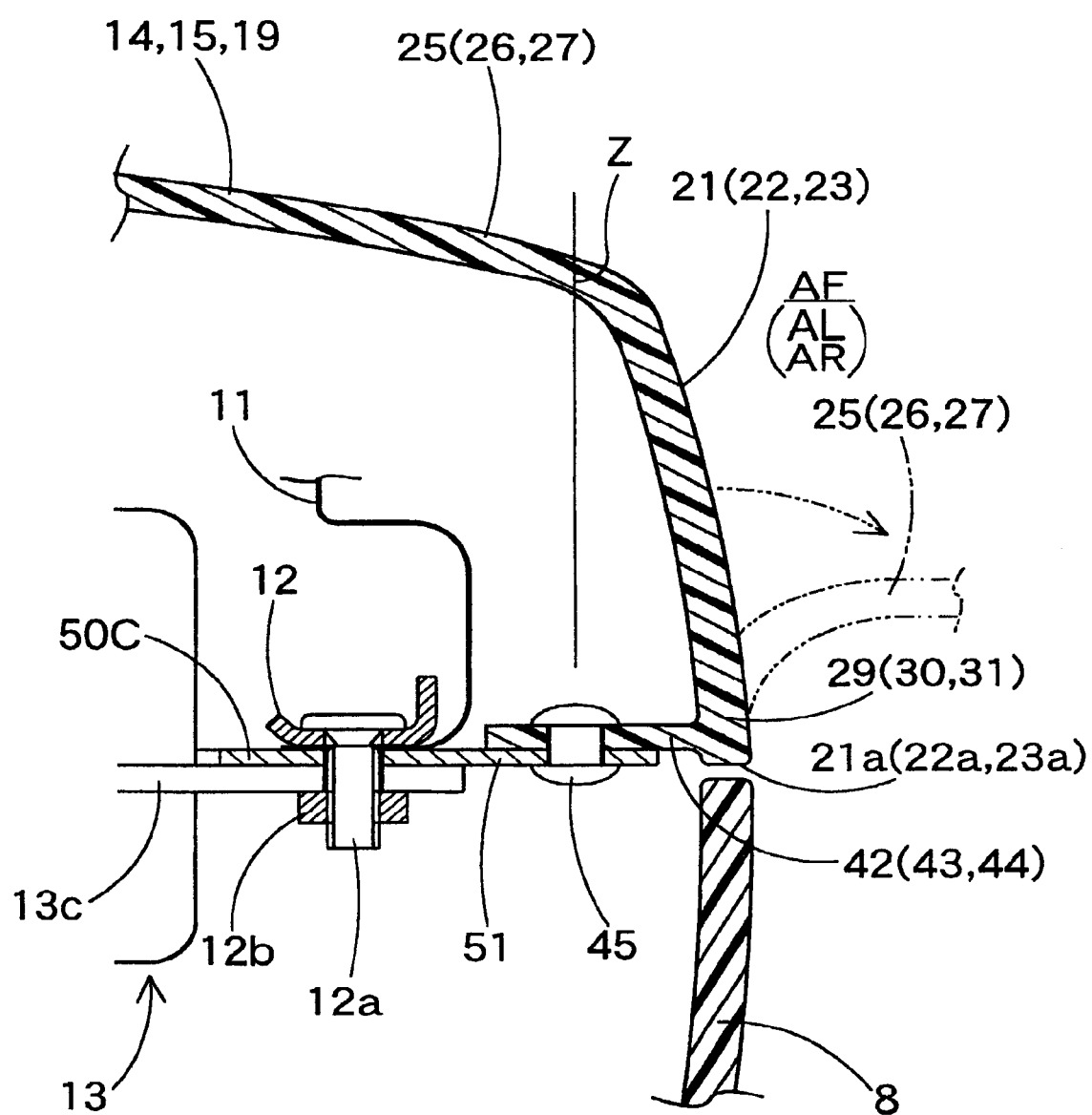
FIG. 17 shows another modification of the first embodiment, and shows a holding structure of the pad of the bag holder in the modification.

According to the holding structure shown in FIG. 16, a bag holder 50B holds the holding walls 46, 47, and 48 utilizing a metal auxiliary plate 56. The side wall 52 of the bag holder 50B is formed with a retaining pawls 52c retained to a peripheries of the retaining portions (holes) 46d, 47d, and 48d provided on the holding walls 46, 47, and 48. The auxiliary plate 56 is formed with a restriction wall 56a that abuts against an outer surfaces of the holding walls 46, 47, and 48. That is, the retaining pawls 52c are prevented from being out from the retaining portions 46d, 47d, and 48d by the restriction wall 56a. The holding walls 46, 47, and 48 are retained by the retaining pawls 52c which are prevented from being out and held by the bag holder S0B. The auxiliary plate 56 is also fastened to the lateral plate 51 of the bag holder 50B utilizing the bolt 12a and nut 12b of the retainer 12.

According to the holding structures shown in FIGS. 15 and 16, the hinges 29, 30, and 31 of the doors 25, 26 and 27 are located near the spaces AF, AL, AR between the spokes, and are disposed on the side of the lower ends 21a, 22a, and 23a of the outer peripheries 21, 22, and 23 of the pad 14 that is lower than the portion Z above the holding walls 46, 47, and 48 by the bag holder 50 near the hinges 29, 30, and 31. Therefore, the doors 25, 26, and 27 shown in FIGS. 15, 16 can widely open.

According to the holding structure shown in FIG. 17, the bag holder 50C and the pad 14 do not have the side walls 52, 40. The lateral plate 42, 43, and 44 of the pad are retained on portions of the lateral plate 51 of the bag holder 50C using the rivets 45, the pad 14 is held on the bag holder 50C. With this holding structure also, the hinges 29, 30, and 31 of the doors 25, 26, and 27 are located near the spaces AF, AL, and AR between the spokes, and are disposed on the side of the lower ends 21a, 22a, and 23a of the outer peripheries 21, 22, and 23 of the pad 14 that is lower than the portion Z above the holding positions (disposed position of the rivet 45) by the bag holder 50 near the hinges 29, 30, and 31. Therefore, the doors 25, 26, and 27 shown in FIG. 17 can also widely open also.

Figure 18:
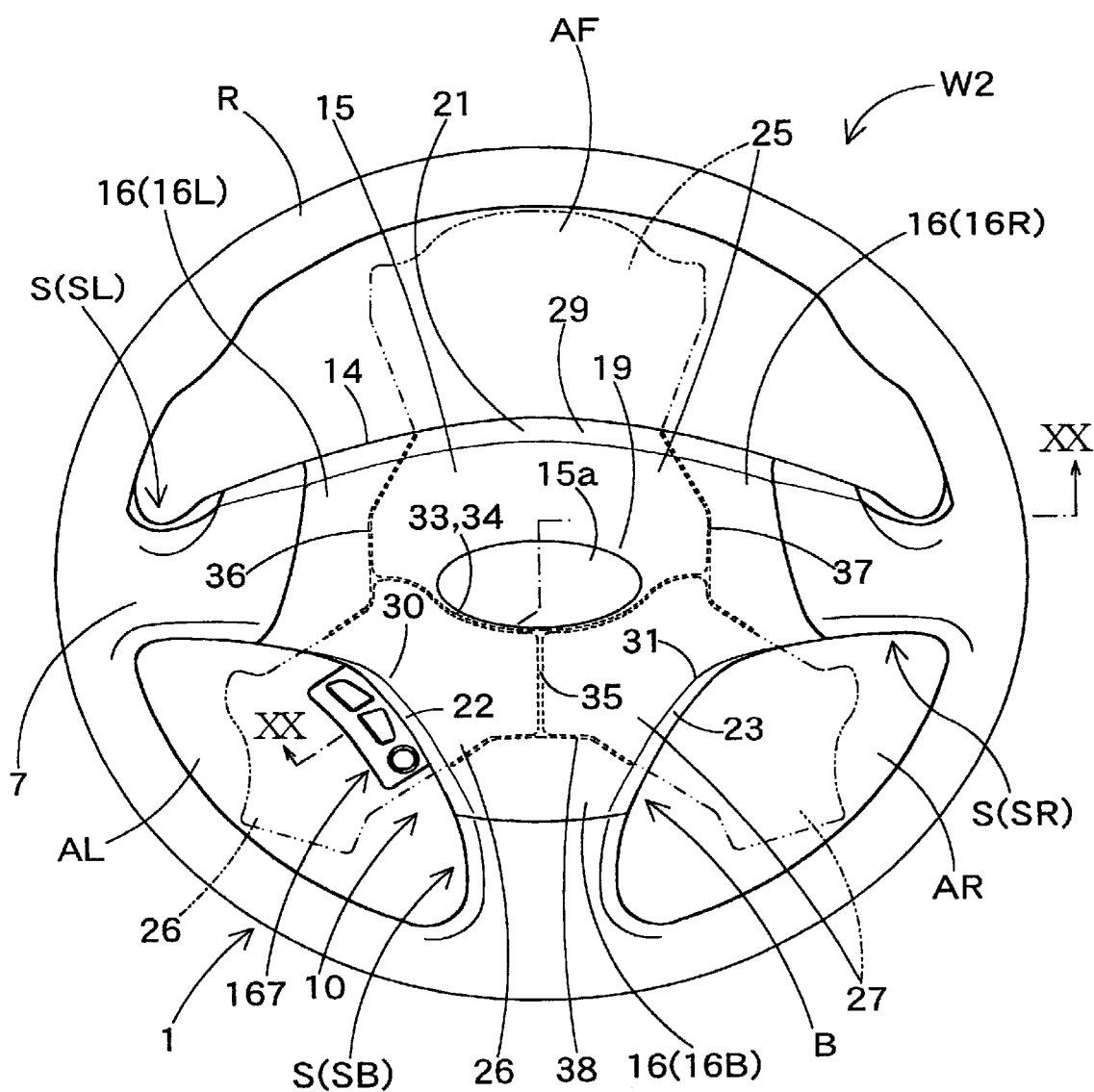
FIG. 18 is a plan view of a steering wheel of a second embodiment, and is a plan view showing a door of a pad.
Figure 19:
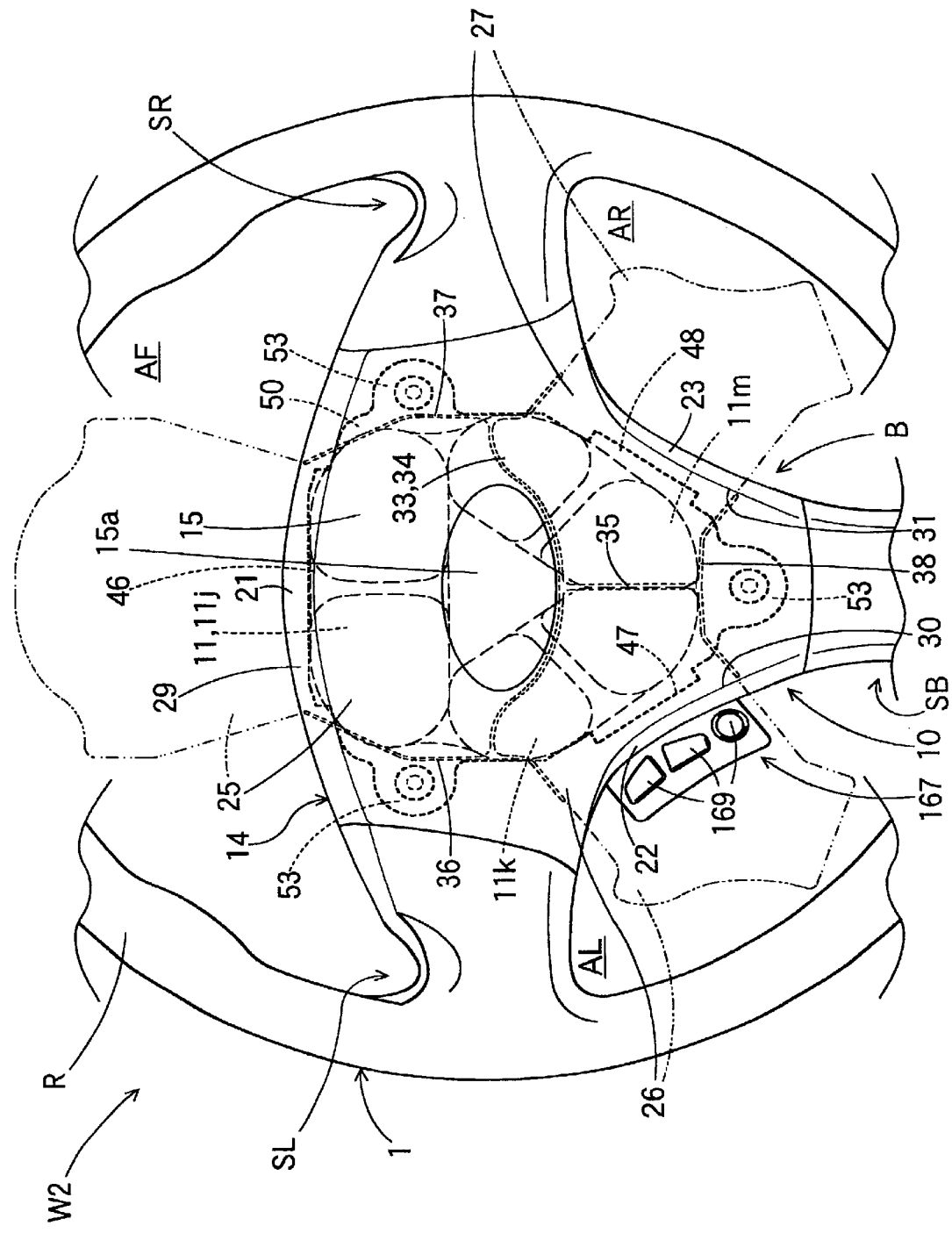
FIG. 19 is a partial plan view of the steering wheel of the second embodiment, and is a plan view showing a folded state of the airbag.
Figure 20:
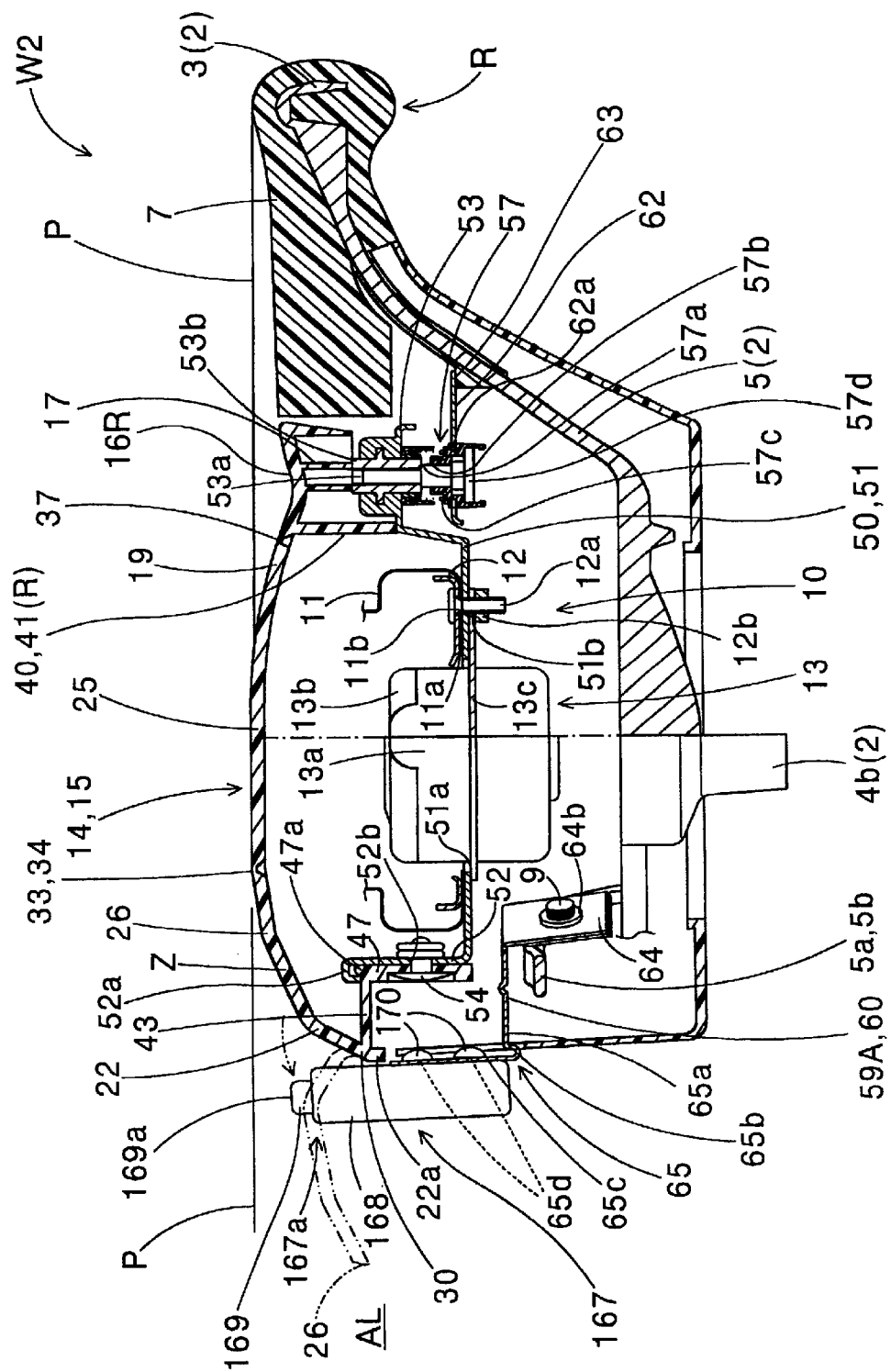
FIG. 20 is a schematic sectional view of the steering wheel of the second embodiment taken along a line XX—XX in FIG. 18.

A steering wheel W2 of a second embodiment, as shown in FIGS. 18 to 20, has a ring R, a boss B and three spokes S (SL, SR, and SB) like the first embodiment. The steering wheel W2 comprises, as constituent parts, a steering wheel body 1, an airbag apparatus 10 and a switch operating portion 167.

In the steering wheel W2 of the second embodiment, only the support plate 59A and the switch operating portion 167A are different from those of the first embodiment, and other members are the same as those of the first embodiment. Therefore, the members in the second embodiment which are the same as those of the first members are designated with the same symbols, and explanation thereof is omitted.

In the steering wheel W2 of the second embodiment, when the door 26 of the pad 14 opened, the switch operating portion 167 is disposed in an area below the door 26.

Figure 21:
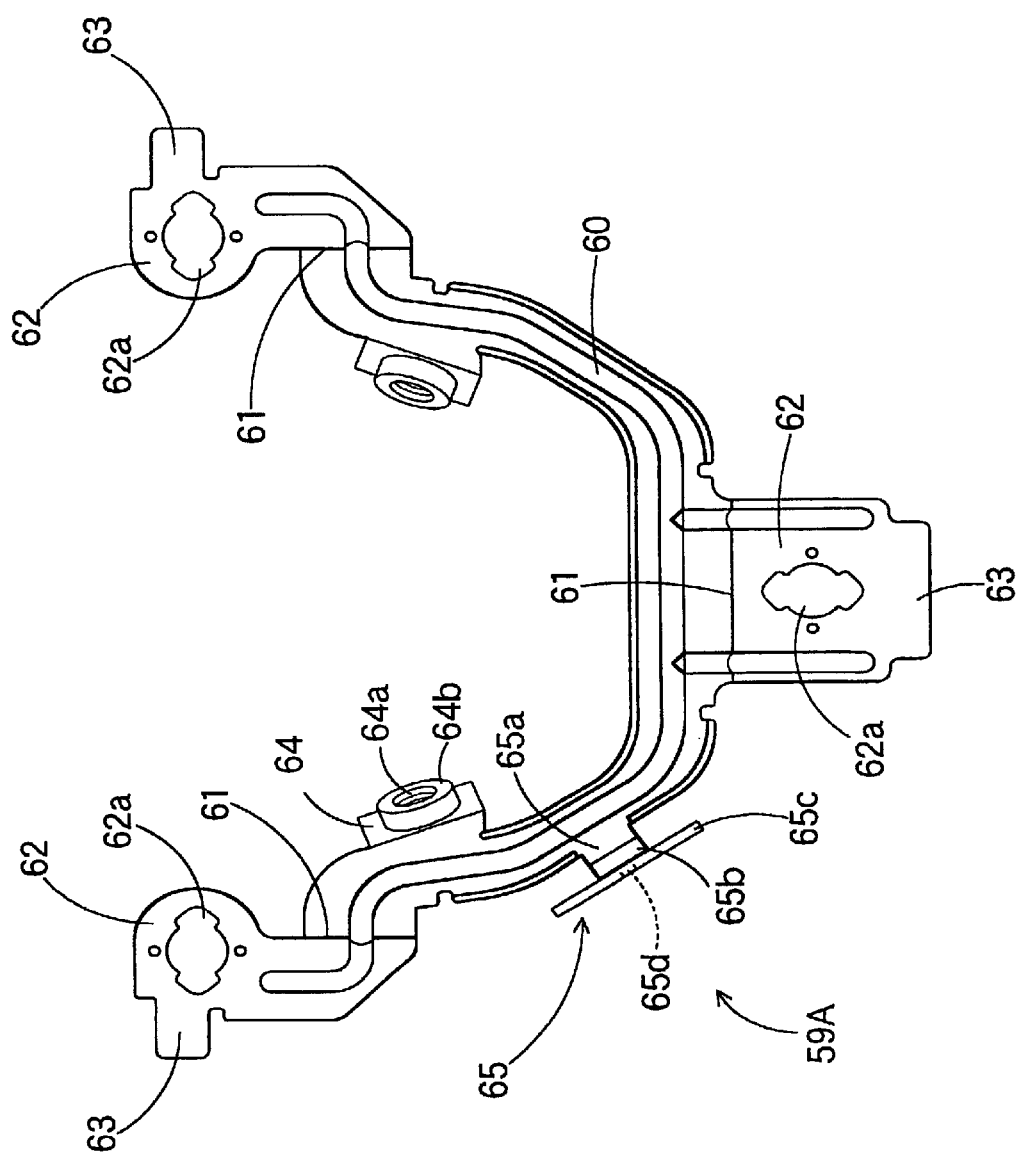
FIG. 21 is a plan view of a support plate used for the airbag apparatus of the second embodiment.

As shown in FIG. 21, a support plate 59A of the second embodiment is made of plate metal, and includes a connecting rod 60, three vertical plates 61, three mounting pieces 62, two connecting pieces 64 and a support piece 65. The second embodiment is different from the first embodiment in that the support plate 59A includes the support piece 65. That is, the connecting rod 60 is of U-shape as viewed from above like the support plate 59 in the first embodiment, each of the vertical plates 61 extends upwardly from a position of the bag holder 50 in the connecting rod 60 near the mounting piece 53 like the support plate 59 of the first embodiment (see FIGS. 3 and 20). Like the support plate 59 of the first embodiment, each of the mounting pieces 62 extends outwardly in the horizontal direction from an upper end of each of the vertical plates 61 and disposed below the mounting piece 53. Each of the connecting pieces 64 extends downwardly from inner edges of left and right opposite sides of the connecting rod 60. The support piece 65 extends outwardly from outer edges of left side of the connecting rod 60.

Each of the mounting pieces 62 is formed at its center with a mounting hole 62a. A stepped bolt 57d of the horn switch mechanism 57 is inserted into the mounting hole 62a. The mounting piece 62 is formed at its outer edge with an abutment piece 63. The abutting piece 63 abuts against and supported by the covering layers 7 of the spokes SL, SR, and SB. A nut 64b having a connection hole 64a is fixed to the connecting pieces 64 on the side of the opposed surface. A bolt 9 is threadedly engaged with the connection hole 64a, and the bolts 9 mount the airbag apparatus 10 to the mounting seats 5c of the spoke core 5 (see FIG. 4).

Figure 22:
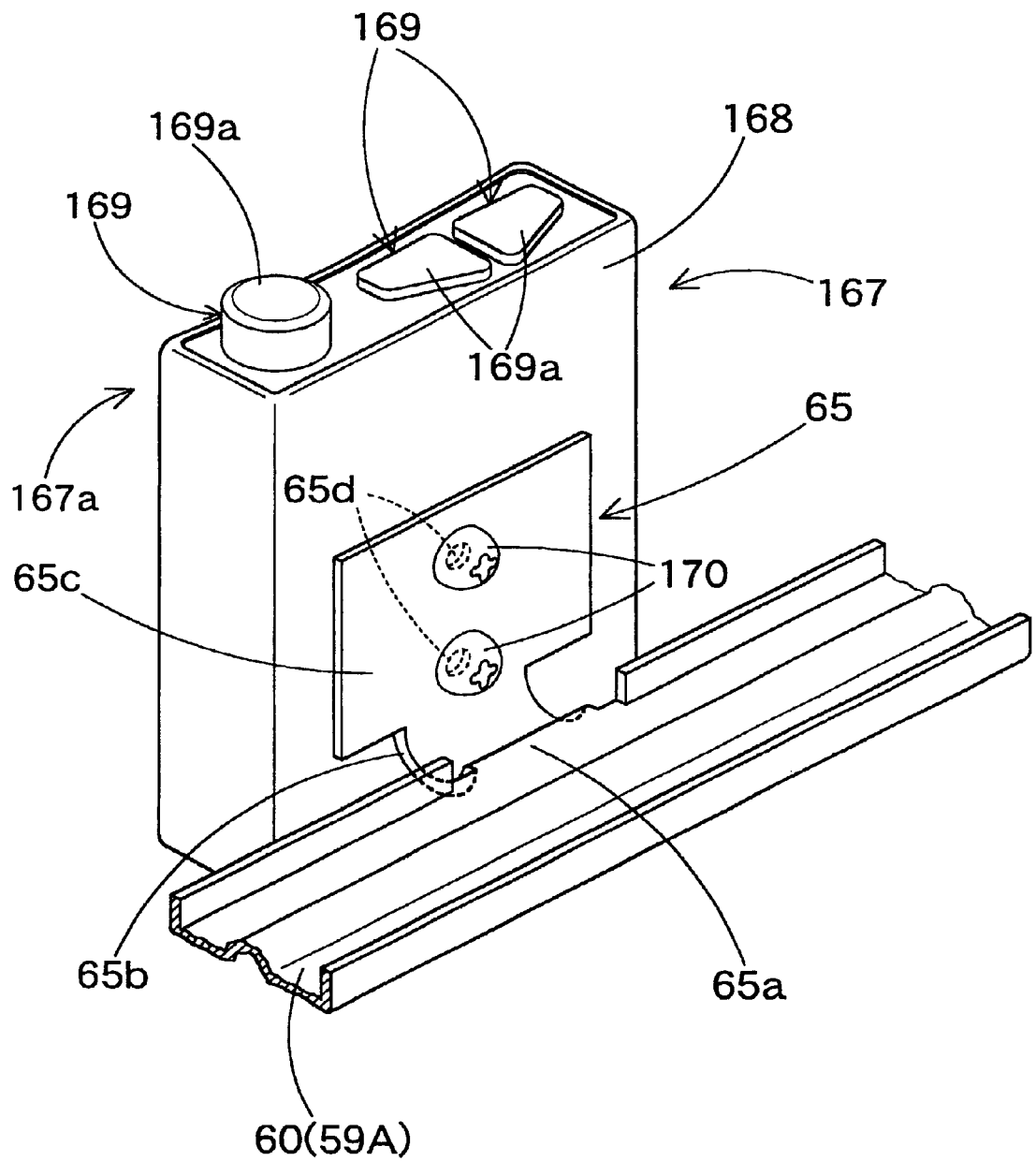
FIG. 22 is a plan view showing the supporting state of the switch operating portion of the second embodiment.

As shown in FIGS. 20, 21, 22, the support piece 65 has substantially L-shaped cross section, and includes an extending portion 65a and a support portion 65c. The extending portion 65a extends outwardly in the lateral direction from the connecting rod 60. The support portion 65c extends upwardly from the vicinity of a tip end of the extending portion 65a. The support portion 65c is formed with a plurality (two in the embodiment)of mounting hole 65d. A screw 170 for mounting and fixing the switch operating portion 167 is inserted into the mounting hole 65d. A to-be deformed portion 65b is formed on an intersection between the extending portion 65a and the support portion 65c. The to-be deformed portion 65b is a portion for inclining the support portion 65c such as to rotate the same outwardly around the intersection. The to-be deformed portion 65b has a reversed U-shaped cross section and is curved so that it can easily be deformed plastically.

As shown in FIGS. 18 to 20 and 22, the switch operating portion 167 is supported by the support portion 65c of the support piece 65, and is disposed such as to project toward the left space AL. The switch operating portion 167 is disposed below the opened left door 26. The switch operating portion 167 includes a case 168 and a plurality of operation buttons 169. Screws 170, 170 are threadedly engaged with the case 168 through the mounting hole 65d of the support portion 65c, and the switch operating portion 167 is mounted to the support portion 65c. The plurality of operation buttons 169 project upwardly from the case 168. In the case of this embodiment, the operation buttons 169 operate the audio equipment. Each of the operation buttons 169 is provided at its upper surface with an operating surface 169a. Each the operating surface 169a is close to the ring surface P so that the operation buttons 169 can easily be operated from above when the steering wheel W2 is steered. If the operating surface 169a is pushed down, the operation buttons 169 is operated.

In the case of this embodiment, when the switch operating portion 167 is supported by the support portion 65c of the support piece 65 using the screws 170, the upper portion 167a is disposed near the outer side of the hinge 30 of the door 26 and above the hinge 30.

When the steering wheel W2 of the second embodiment is mounted to the vehicle, the airbag apparatus 10 is previously assembled like the first embodiment.

Like the first embodiment, the airbag apparatus 10 is assembled by inserting the retainer 12 into the airbag 11, by projecting the bolts 12a of the retainer 12 from the mounting holes 11b and then, by folding the airbag 11. The airbag 11 is folded in such a manner that three folded portions 11j, 11k, and 11m (see FIG. 19) are prepared, the folded portions 11j, and 11k, 11m are disposed below the doors 25, 26 and 27 of the pad 14. That is, when the airbag 11 is developed and expanded, the doors 25, 26, and 27 can reliably receive the pushing force of the folded portions 11j, 11k, and 11m.

After the folding operation of the airbag 11 was completed, like the first embodiment, in order to prevent the crease from being restored and eliminated, the airbag 11 may be wrapped by a thin wrapping bag that can be ruptured.

After the airbag 11 is folded, it is accommodated in the bag holder 50. In this step, each bolt 12a of the retainer 12 projecting from the airbag 11 is inserted through the through hole 51b of the bag holder lateral plate 51, and the airbag 11 is placed on the lateral plate 51 surrounded by the side wall 52. At that time, three clots (folded portions) 11j, 11k, and 11m are disposed as follows. The clot 11j is disposed on the side of the front edge of the lateral plate 51, the clots 11k and 11m are disposed on the left and right sides on the side of the rear edge of the lateral plate 51, and the airbag 11 is placed on the lateral plate 51.

Then, the body 13a of the inflator 13 is inserted through the insertion hole 51a of the bag holder lateral plate 51, and the bolt 12a of the retainer 12 is inserted through the inflator flange 13c. The flange 13c of the inflator 13 is abutted against a lower surface of the lateral plate 51. The nut 12b is threadedly engaged with the bolt 12a projecting from the flange 13c, and the airbag 11, the bag holder 50 and the inflator 13 are integrally assembled.

Thereafter, the pad 14 is pushed down from above such as to surround the outer peripheral surface on the side of the folded airbag 11 by the side wall 40. Then, the retaining pawls 52a of the bag holder 50 are retained to the retaining portions 46a, 47a, and 48a (see FIGS. 3 and 7 for the retaining portions 46a, 48a) of the front, left and right holding walls 46, 47, and 48. The mounting holes 46b, 47b, and 48b (see FIGS. 3 and 7 for the mounting holes 46b, 48b) of the front, left and right holding walls 46, 47, and 48 are aligned to the mounting holes 52b of the bag holder 50. Then, the rivets 54 are inserted into the mounting holes 46b, 47b, 48b, and 52b and the front, left and right holding walls 46, 47, and 48 and the side wall 52 are fastened.

Then, the switch operating portion 167 is mounted to the support portion 65c of the support piece 65 of the support plate 59A using the screws 170. The horn switch mechanisms 57 are disposed on the mounting pieces 62 of the support plate 59A, and the portions of these horn switch mechanisms 57 are disposed on the lower surfaces of the mounting pieces 53 of the bag holder 50. Further, the stepped bolt 57d is threadedly engaged with the screw hole 53a from below the mounting pieces 62, and the airbag apparatus 10 can be assembled.

The lower cover 8 is mounted to the steering wheel core 2 having the covering layer 7 using a screw or the like, and the steering wheel body 1 is assembled. Then, the boss 4a of the boss core 4 is fitted around the steering shaft 80 of the vehicle (see FIG. 3) and then, the steering wheel body 1 is mounted to the steering shaft 80 using the nut 81.

Then, lead wires (not shown) extending from the horn switch mechanism 57 of the airbag apparatus 10 and the various switch operating portions 167 are connected to a connector (not shown) on the side of the steering wheel body 1. Further, each of the abutting piece 63 of the support plate 59 of the airbag apparatus 10 is abutted and supported against the covering layer 7 of the spokes SL, SR, and SB, and the connecting pieces 64, 64 are abutted against the inner surface of the mounting seats 5c of the rear core 5a. Next, the mounting bolts 9 are threadedly engaged with the connecting holes 64a of the connecting pieces 64 from the hole 8a (see FIG. 4) of the lower cover 8 through the mounting holes 5d of the mounting seats 5c. As a result, the steering wheel W2 can be assembled and the steering wheel W2 can be mounted to the steering shaft 80.

In the steering wheel W2 assembled in the above-described manner, the operating surface 169a of each the operation button 169 of the switch operating portion 167 is pushed down, the predetermined equipment is operated.

If the inflator 13 is actuated, the expansion gas from the inflator 13 flows into the airbag 11. Then, the airbag 11 expands and the folding portions 11j, 11k, 11m are developed to push up the three doors 25, 26, and 27 of the pad 14. Therefore, the doors 25, 26 and 27 of the pad 14 rupture the to-be ruptured portion 33 and open around the hinges 29, 30, and 31 as rotation centers. As a result, the opening forming portion 19 largely opens, the airbag 11 projects from the pad 14 and expands into a predetermined shape.

When the airbag apparatus 10 is developed and expanded like in the same manner as the first embodiment, the hinges 29, 30, and 31 of the doors 25, 26, and 27 are located near the spaces AF, AL, and AR between the spokes SL, SR, and SB, and the hinges 29, 30, and 31 are disposed on the side of the lower ends 21a, 22a, and 23a of the pad outer peripheries 21, 22, and 23 lower than a portion Z (see FIGS. 20, 3, and 7). The portion Z is above the holding portions (front, left and right holding walls) 46, 47, and 48 held by the bag holder 50 near the hinges 29, 30, and 31. Therefore, the doors 25, 26, and 27 open around the hinges 29, 30, and 31 located near the outer periphery lower ends 21a, 22a, and 23a of the pad 14. As a result, the doors 25, 26, and 27 can secure their own areas widely and open as wide as possible.

Figure 23:
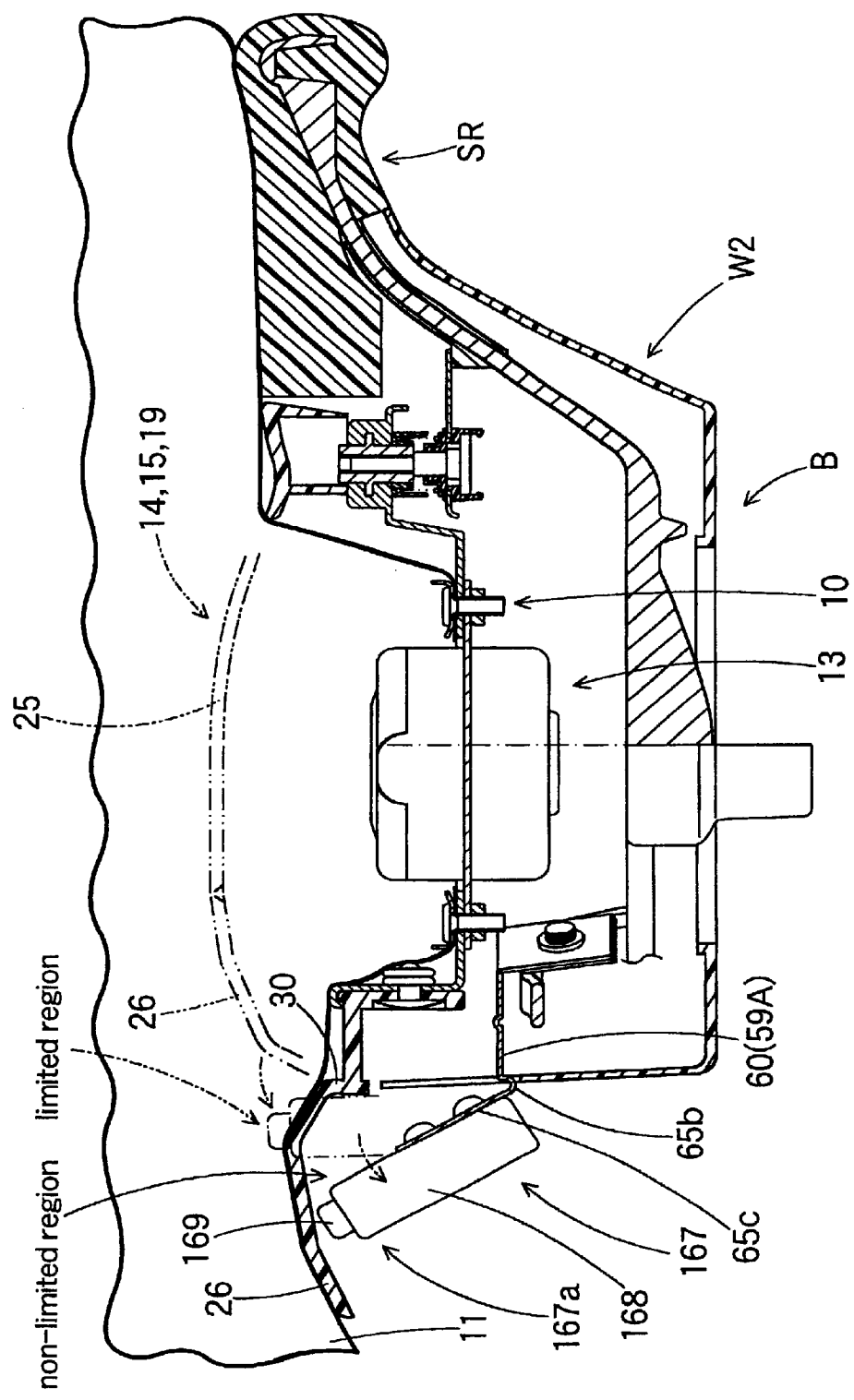
FIG. 23 is a schematic sectional view of the steering wheel when the airbag is developed and expanded in the second embodiment.

When the left door 26 opened around the hinge 30 as a rotation center, as shown in FIG. 23, the upper portion 167a of the switch operating portion 167 is pushed by the door 26 that opens rapidly. Therefore, the to-be deformed portion 65b is plastically deformed, the support portion 65c of the support piece 65 rotates and moves around the to-be deformed portion 65b such as to be inclined toward the space AL. As a result, the switch operating portion 167 supported by the support portion 65c is disposed in the non-limited region. This non-limited region is a region where the switch operating portion 167 does not limit the opening completion state of the door 26. Thus, the door 26 completes the opening operation in the widely opened state without being limited by the switch operating portion 167.

Therefore, according to the steering wheel W2 having the airbag apparatus 10 in the second embodiment, even if the switch operating portion 167 is disposed below the pad opened door 26, the door 26 of the pad 14 can widely open. Thus, the initially expanding airbag 11 can widely develop. As a result, even if the airbag 11 is developed and expanded in a state in which the driver is close to the steering wheel W2, it is possible to prevent the airbag 11 from applying a partial pushing force to the driver.

In the second embodiment, the switch operating portion 167 is pushed by the opening door 26 and rotated and moved, while plastically deforming the to-be deformed portion 65b, and the switch operating portion 167 is disposed in the non-limited region. In the normal state before the door 26 opens, the switch operating portion 167 can be disposed such as to approach the ring surface P located at upper position. Thus, in the second embodiment, even if the switch operating portion 167 is disposed at a lower position below the pad door 26 which is opened, the door 26 can widely open, and the operability of the switch operating portion 167 is enhanced.

Figure 24:
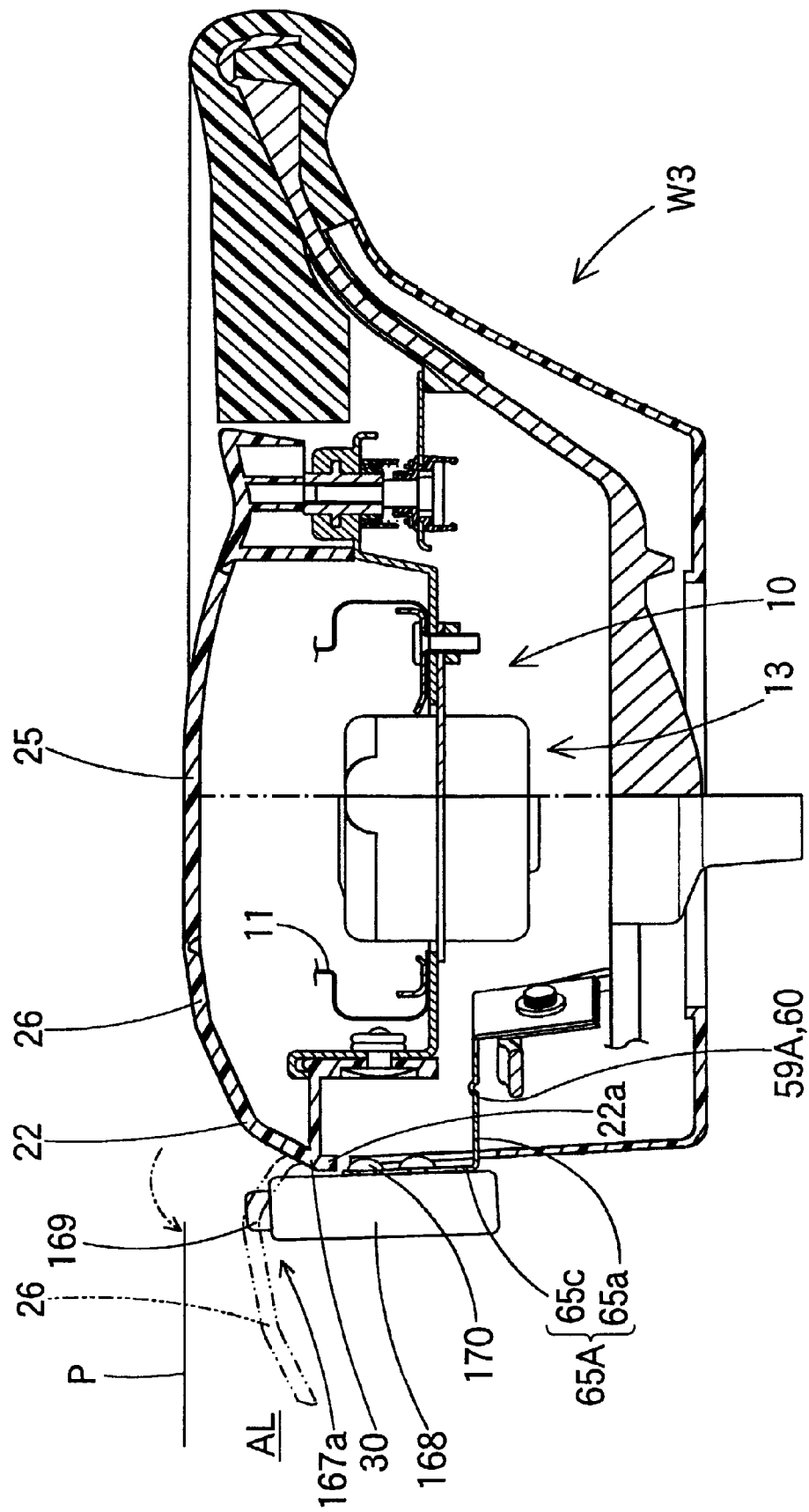
FIG. 24 is a schematic sectional view of a steering wheel of a third embodiment.
Figure 25:
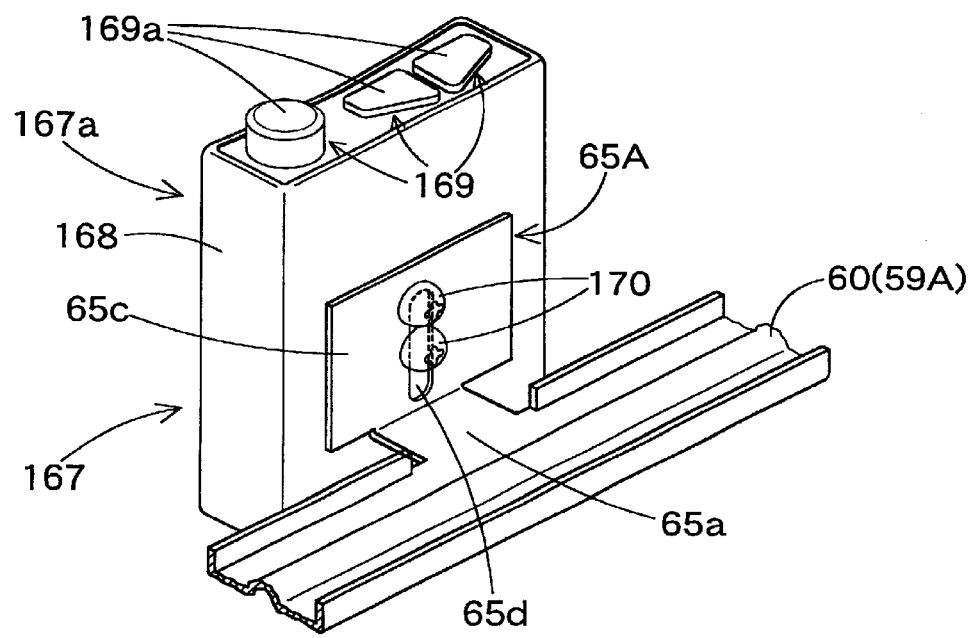
FIGS. 25A and 25B are plan views showing the supporting state of the switch operating portion of the third embodiment.
Figure 25:
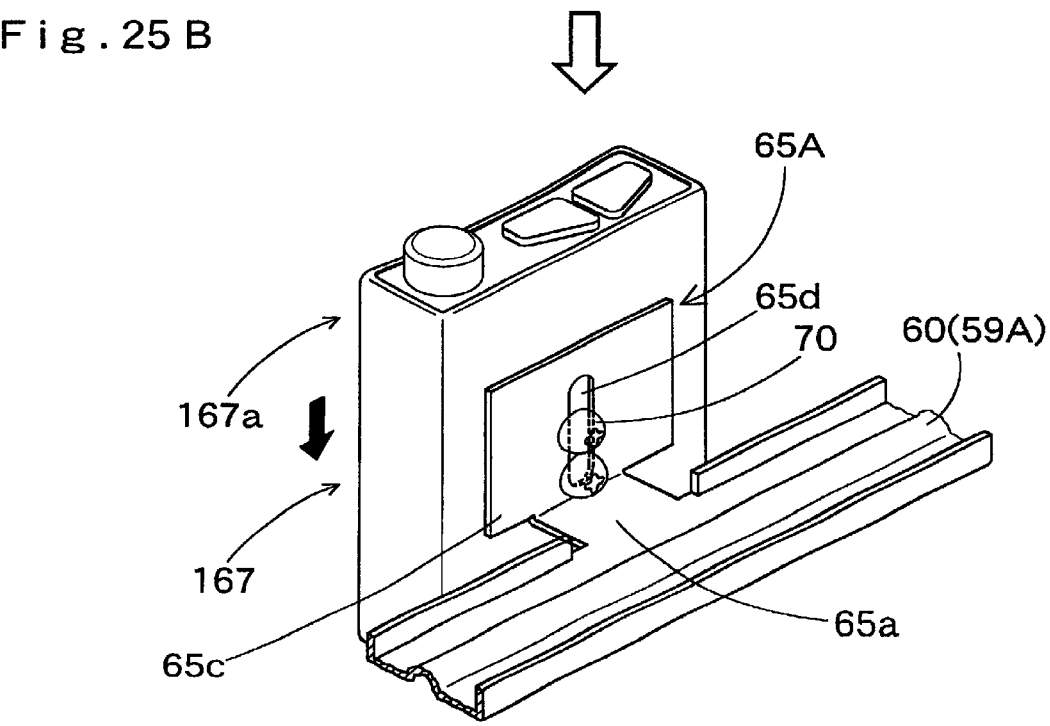
Figure 26:
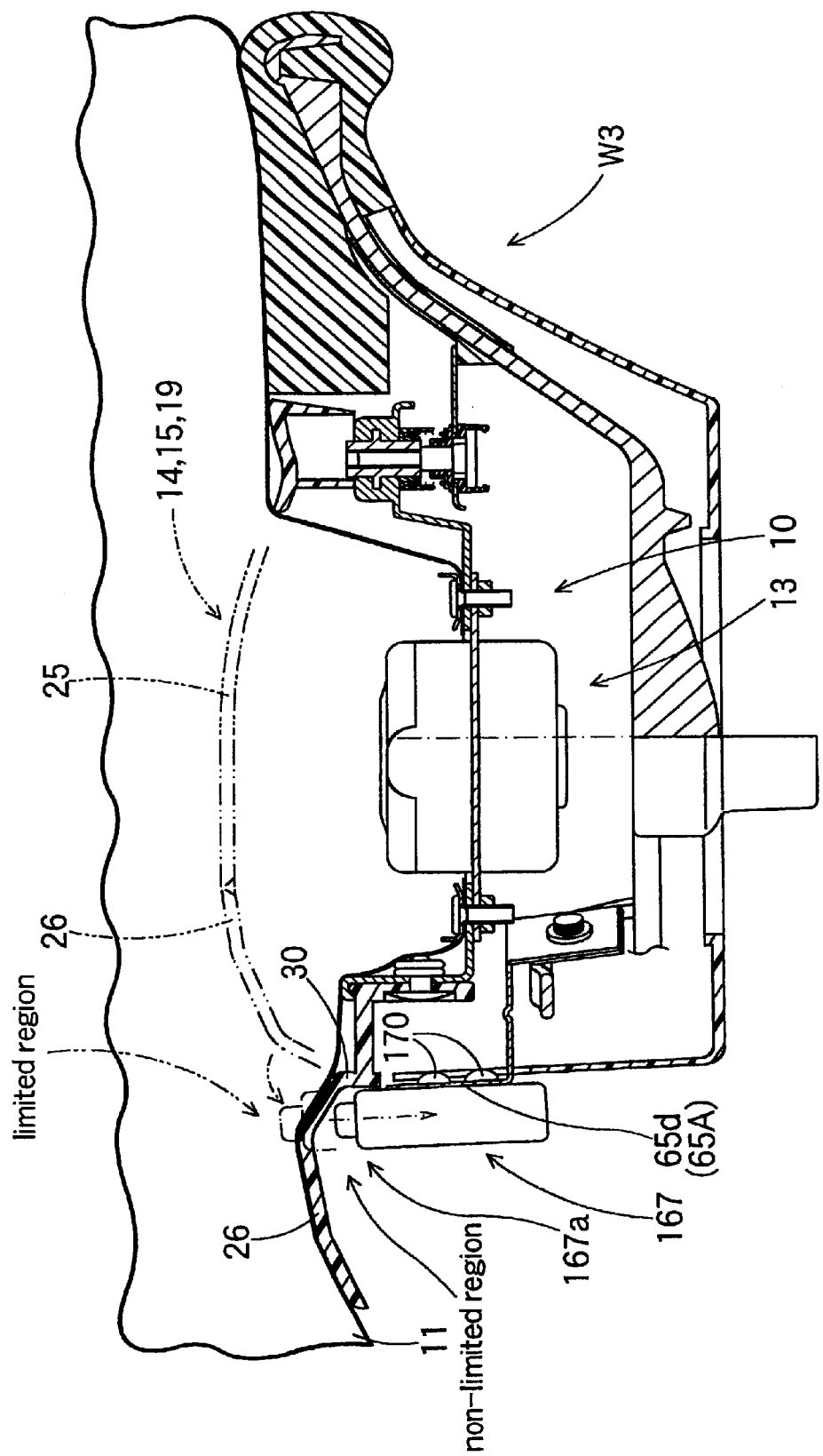
FIG. 26 is a schematic sectional view of the steering wheel when the airbag is developed and expanded.

If the switch operating portion 167 is designed such that it is pushed by the opening door 26 and moved and disposed in the non-limited region, the switch operating portion 167 may be constructed like a steering wheel W3 of a third embodiment shown in FIGS. 24 to 26.

In the steering wheel W3 of the third embodiment, a mounting hole 65d provided on a support portion 65c of a support piece 65A is made as a long hole extending vertically. The screws 170, 170 set the fastening strength to a predetermined value. The screws 170, 170 are threadedly engaged with a case 168 of a switch operating portion 167. The fastening strength of the screw 170 is set to such a degree that the switch operating portion 167 is not lowered by a normal pushing down operation of the operation buttons 169 to the operating surface 169a (see FIGS. 24 and 25A). The fastening strength of each of the screws 170, 170 is set such that when the door 26 abuts against the upper portion 167a of the switch operating portion 167 from above, the switch operating portion 167 can be lowered along the long hole mounting hole 65d in a state in which the screw 170 is threaded (see FIGS. 25B and 26). A vertical length of the mounting hole 65d is set to such a degree that when the switch operating portion 167 is disposed on the upper portion, excellent operability can be secured, and when the door 26 opens, the switch operating portion 167 can be disposed in the non-limited region of the door 26.

With this steering wheel W3 of the third embodiment, the same working effect as that of the second embodiment can be obtained.

Figure 27:
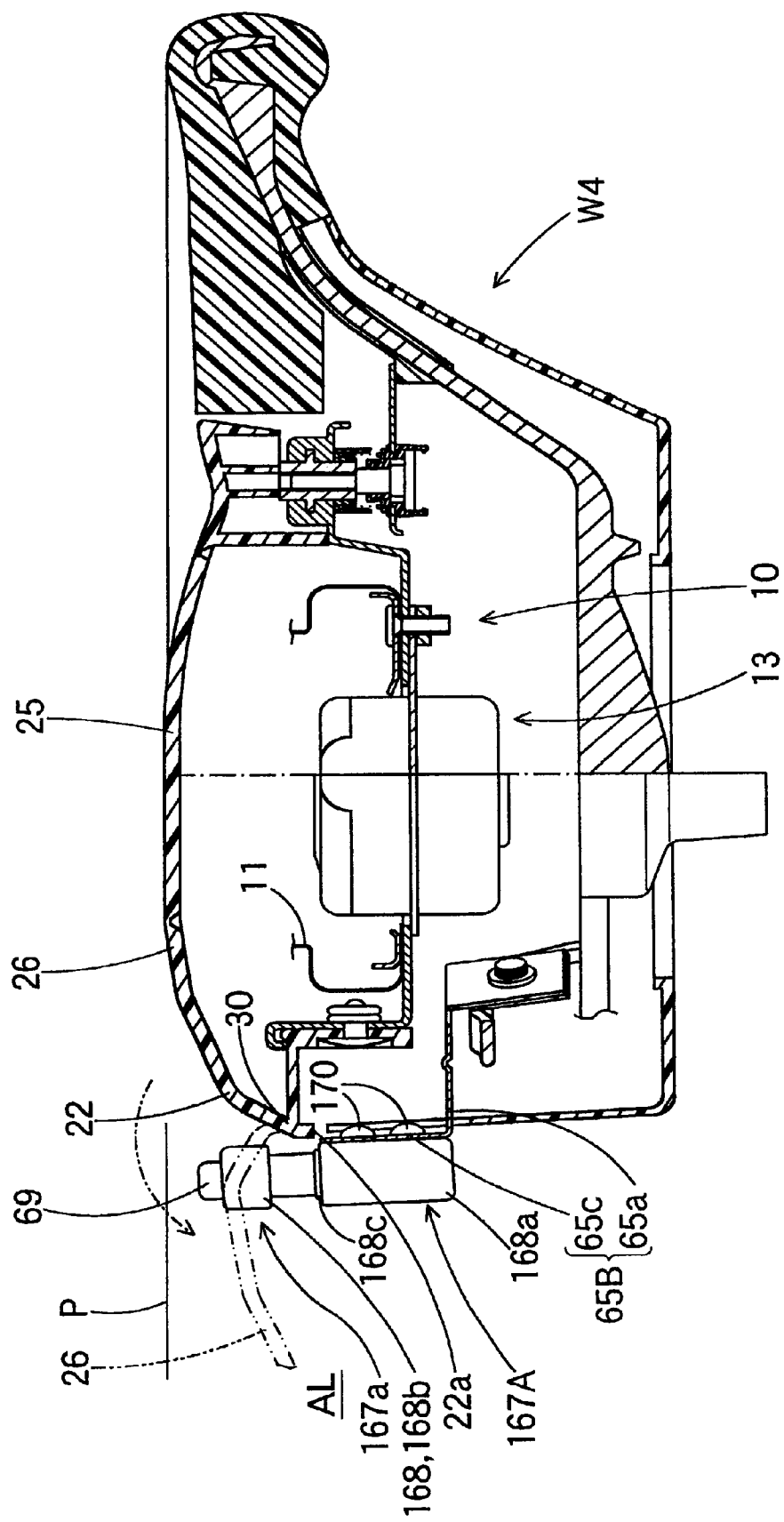
FIG. 27 is a schematic sectional view of a steering wheel of a fourth embodiment.
Figure 28A:
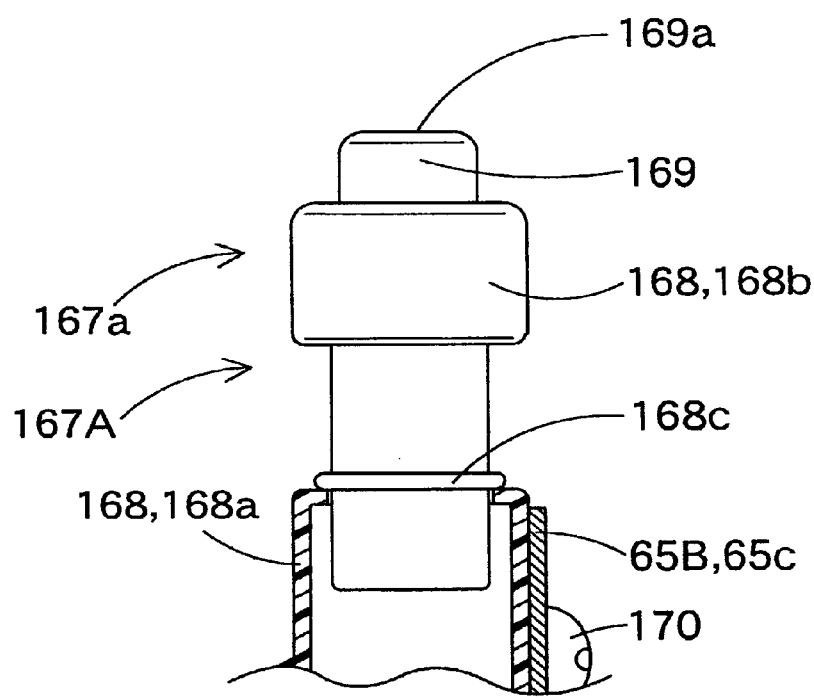
FIGS. 28A and 28B are partial sectional views showing a supporting state of a switch operating portion of the fourth embodiment.
Figure 28B:
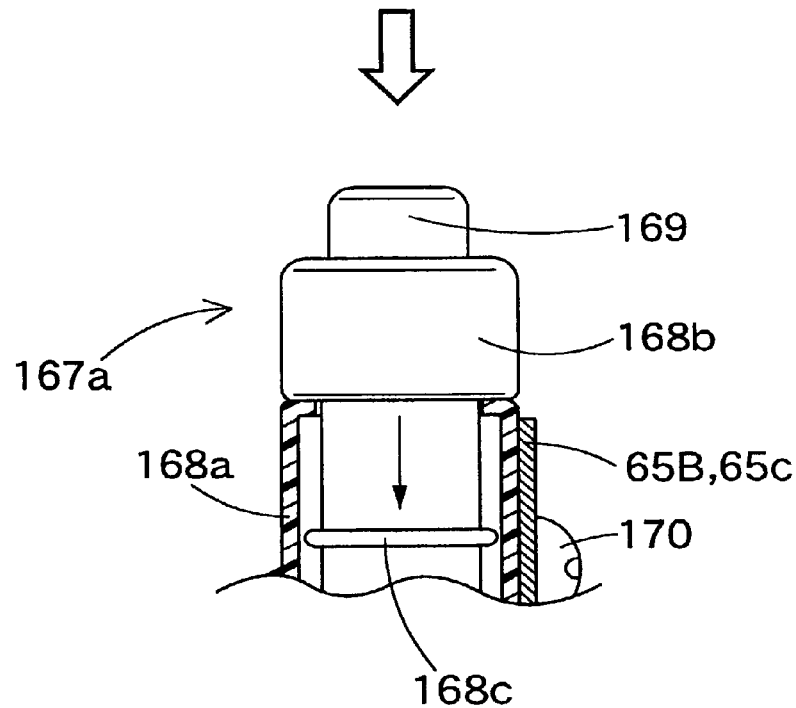
Figure 29:
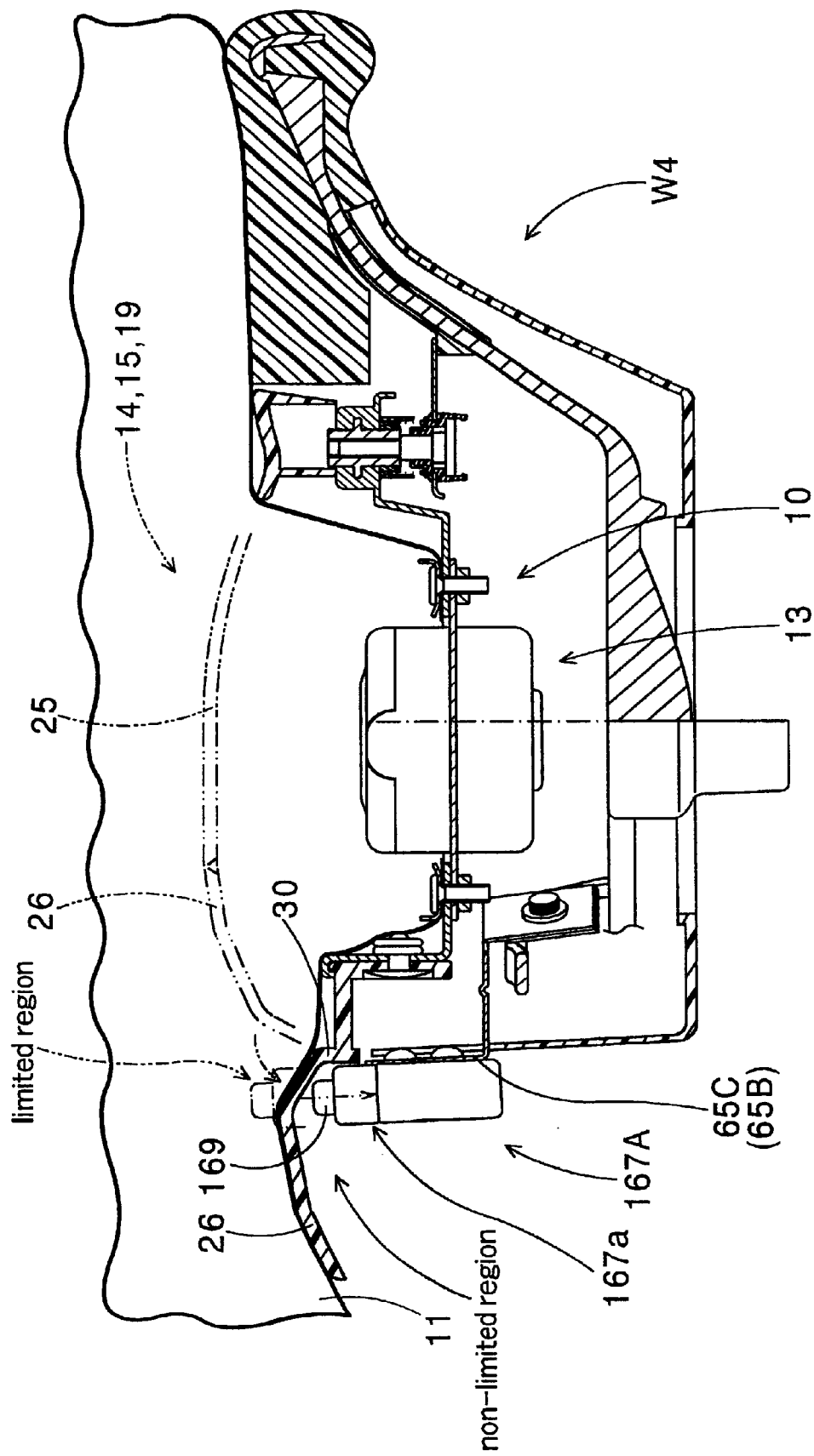
FIG. 29 is a schematic sectional view of the steering wheel when the airbag of the fourth embodiment is developed and expanded.

Further, a steering wheel may be constructed as a steering wheel W4 of a fourth embodiment shown in FIGS. 27 to 29. In this steering wheel W4, a case 168 itself of a switch operating portion 167A is shrunk by pushing force of the door 26. That is, the case 168 includes a lower case 168a and an upper case 168b. The lower case 168a is disposed at a lower portion of the case 168. The lower case 168a is mounted to the support portion 65c of the support piece 65B using a screw 170, and supported by a support portion 65c. The upper case 168b is disposed above the lower case 168a. The upper case 168b is formed at its outer periphery with a projecting position limiting portion 168c. With a normal operation of the operation buttons 169 for pushing down the operating surface 169a, the position limiting portion 168c limits the position (see FIGS. 27, 28A), and the upper case 168b does not move toward the lower case 168a. When the door 26 opens, if the door 26 abuts against the upper portion 167a of the switch operating portion 167A from above, the position limiting portion 168c can not limit the position by this pushing force. That is, the upper case 168b moves into the lower case 168a (see FIGS. 28B, 29), the upper portion 167a of the switch operating portion 167A is located in the non-limited region of the door 26. With this steering wheel W4 of the fourth embodiment, the same working effect as those of the first and second embodiments.

Figure 30:
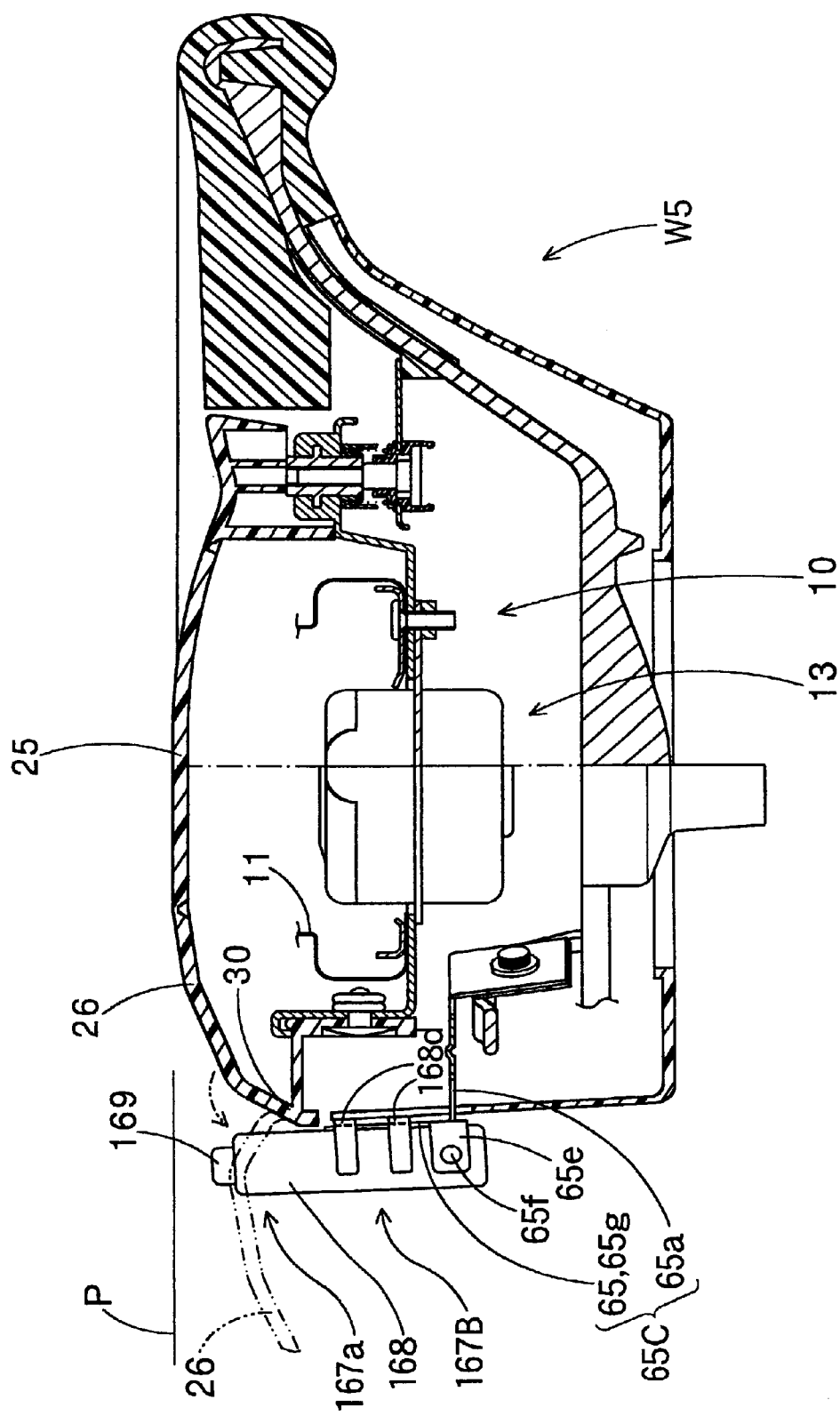
FIG. 30 is a schematic sectional view of a steering wheel of a fifth embodiment.
Figure 31:
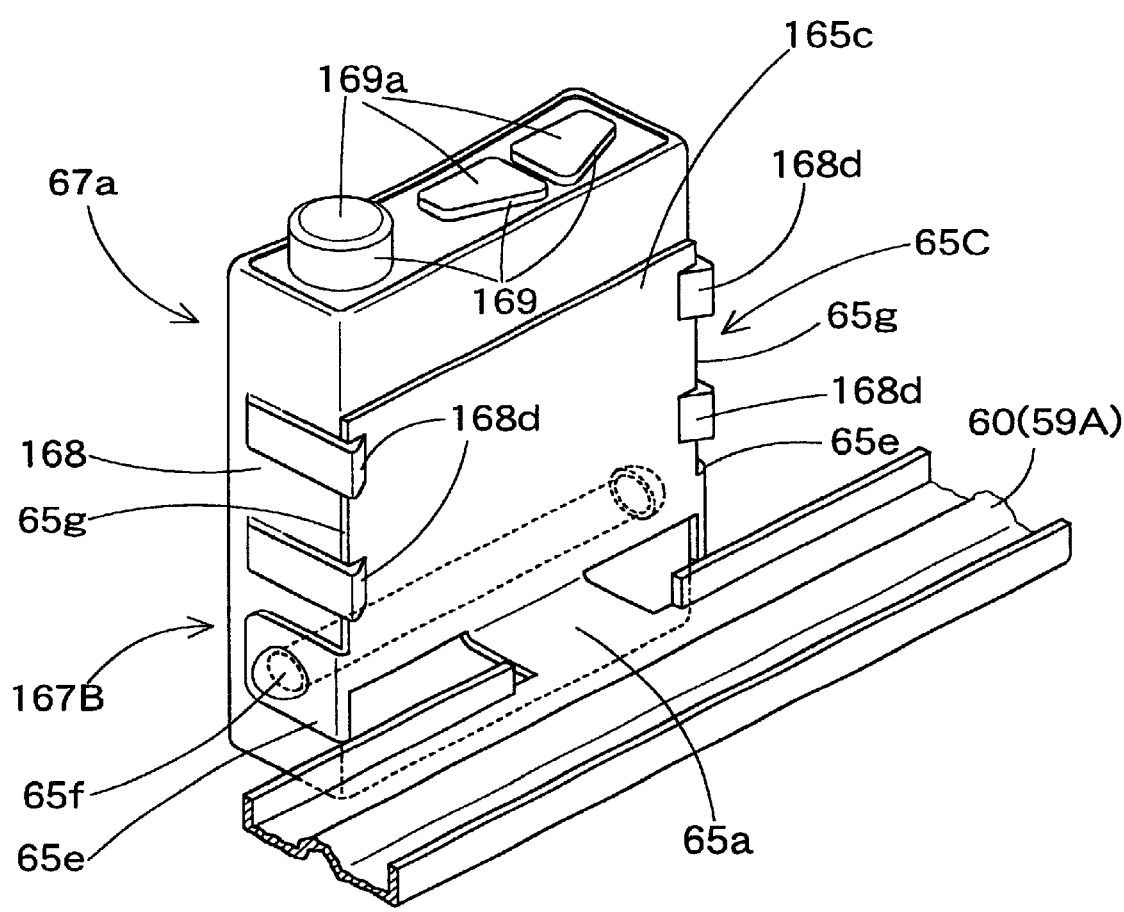
FIG. 31 is a plan view showing a supporting state of a switch operating portion of the fifth embodiment.
Figure 32:
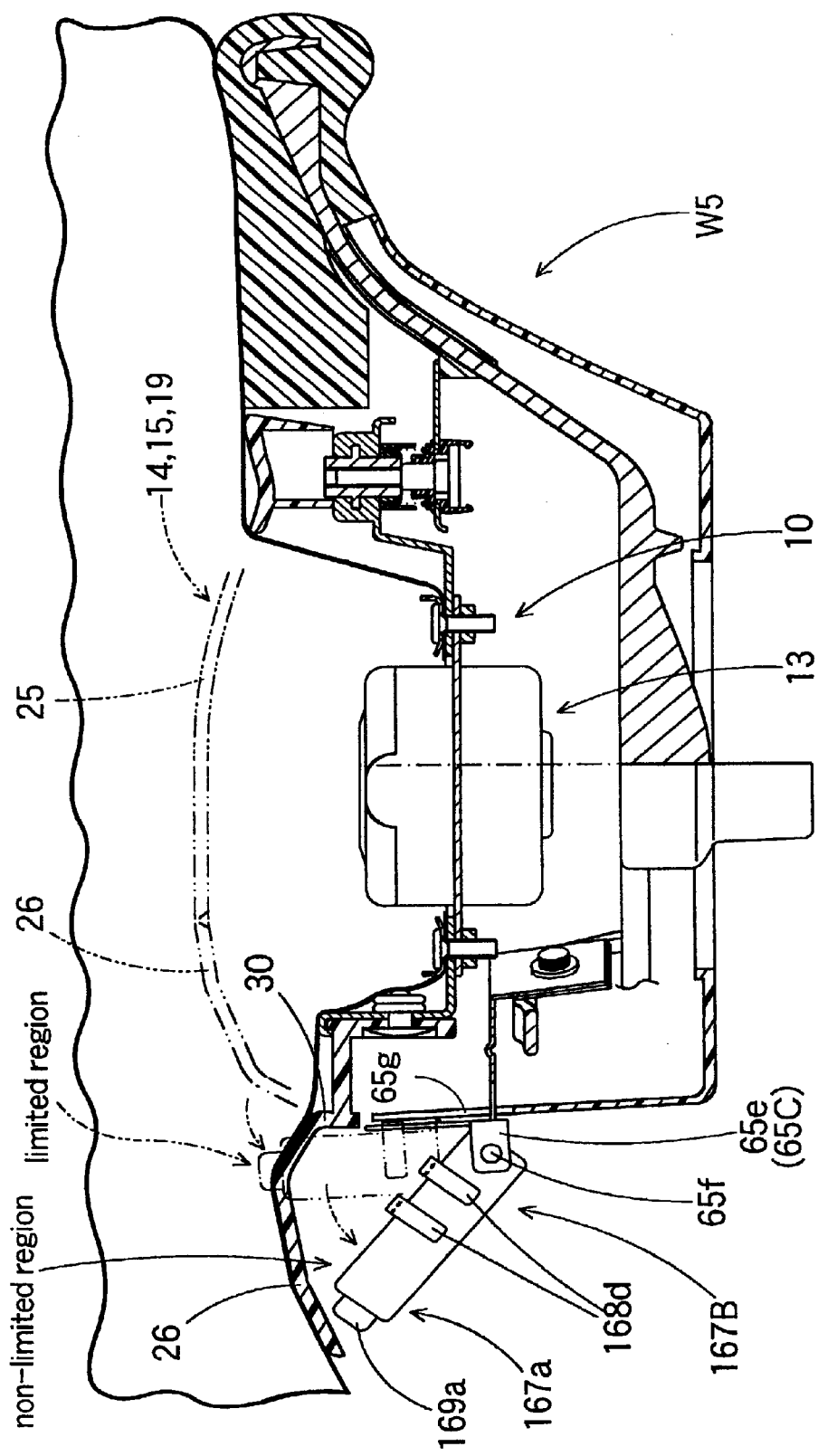
FIG. 32 is a schematic sectional view of the steering wheel when the airbag of the fifth embodiment is developed and expanded.
Figure 33:
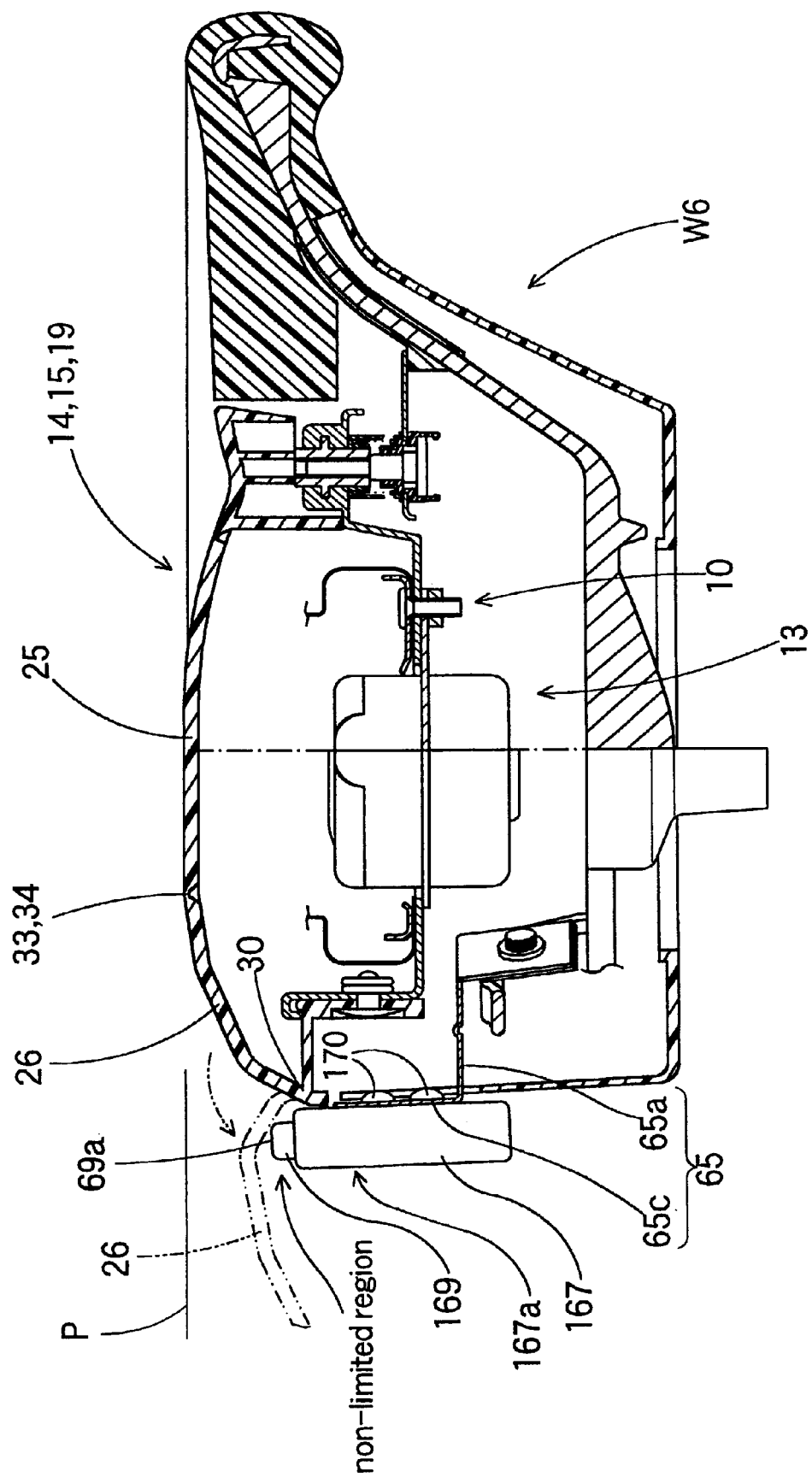
FIG. 33 is a schematic sectional view of a steering wheel of a sixth embodiment.

Further, a steering wheel may be constructed as a steering wheel W5. of a fifth embodiment shown in FIGS. 30 to 32. In this steering wheel W5, a lower end of a switch operating portion 167B is supported on the support portion 65c of the support piece 65C so that the lower end can rotate toward the space AL. A plurality of retaining pawls 16d extending from the case 168 is disposed on an upper portion of the switch operating portion 167B. The retaining pawls 168d retain the edges 65g, 65g on the side surfaces of the support portion 65c. Brackets 65e, 65e holding a support shaft 65f are disposed on opposite sides of a lower end of the support portion 65c of the support piece 65C. The switch operating portion 167B is rotatably supported by the support shaft 65f. An upper portion 167a of the switch operating portion 167B projects upward from the support portion 65c. The upper portion 167a of the switch operating portion 167B is disposed near the outer side of the hinge 30 of the door 26 and above the hinge 30.

According to the steering wheel W5 of the fifth embodiment, when the left door 26 opens around the hinge 30 as rotation center, as shown in FIG. 32, the upper portion 167a of the switch operating portion 167B is pushed by the door 26 that opens rapidly. Then, the retaining pawls 168d come out from the supporting both edges 65g, 65g, and the switch operating portion 167B is rotated and moved around the support shaft 65f as the rotation center such as to be inclined toward the space AL. As a result, the switch operating portion 167B is disposed in the non-limited region where the opening completion state of the door 26 is not limited. Therefore, the door 26 completes the opening operation in the widely opened state without being limited by the switch operating portion 167B.

In this steering wheel W5 also, the switch operating portion 167B is pushed by the opening door 26 and moved, and disposed in the non-limited region. That is, according to this steering wheel W5 also, in a normal state before the door 26 is opened, the switch operating portion 167B can be disposed near the ring surface P at a upper position as close as possible. As a result, with this steering wheel W5 also, the door 26 can open widely and the operability of the switch operating portion 167B is excellent.

In the steering wheels W2 and W5 of the second and fifth embodiments, operation direction of each operation button 169 of each switch operating portion 167, 167B is downward direction. When the switch operating portion 167 or 167B is moved to the non-limited region, it is not moved downwardly. That is, when the switch operating portion 167 or 167B is pushed by the door 26, the switch operating portion rotated and moved in the lateral direction so as to intersect with the operation direction of the operation buttons 169 substantially at right angles, and is moved to the non-limited region of the door 26. Therefore, even if the operation buttons 169 that must be operated strongly downward at the time of operation is disposed on the switch operating portion 167 or 167B, the switch operating portion 167 or 167B is less prone to move the non-limited region. As a result, in the second and fifth embodiments, the operability of the operation buttons 169 can be stabilized.

Although the operability of the operation buttons 169 of the switch operating portion 167 is not excellent, the operating surface 169a may be located at a position largely lower than the ring surface P like a steering wheel W6 shown in FIG. 20. That is, in the steering wheel W6, the switch operating portion 167 is originally disposed in the non-limited region below the opened door 26. According to this steering wheel W6, even if the opening operation of the door 26 has been completed, the door does not come into contact with the switch operating portion 167.

Further, in the second to sixth embodiments, three spoke type steering wheel W2, W3, W4, W5 and W6 are described. As the second to sixth embodiments, two or four spoke type steering wheel may be used. In the steering wheel, the number of the doors of the pad is not limited to three, and one or more doors may be provided.

What is claimed is:

1. A steering wheel including an airbag apparatus, the steering wheel comprising:

a ring which is held by an operator for steering;

a boss located at a center of the ring, wherein the airbag apparatus is located on the boss;

first, second, and third spokes for connecting the ring and the boss, wherein three spaces are formed by the spokes such that each of the spaces is located between an adjacent pair of the spokes, respectively;

a steering wheel body;

an airbag folded such that the airbag is expandable;

an inflator for supplying expansion gas to the airbag;

a bag holder connected to the steering wheel body for holding the folded airbag and the inflator;

a pad, which is held by the bag holder, for covering the folded airbag, wherein the pad includes:

a ceiling wall;

first, second, and third doors which are formed in the ceiling wall, wherein each of the doors is provided at its periphery with a breakable portion, which is formed in the ceiling wall, and each door is pushed by the airbag when the airbag expands such that the breakable portion is ruptured, and each door opens around a hinge located on an outer periphery of the pad, such that one opening, through which the airbag projects, is formed in a center of the pad, and each of the doors is located in a respective one of the three spaces when opened;

lateral plates that correspond to the doors, wherein each lateral plate extends horizontally inward from the vicinity of the outer peripheral edge of the ceiling wall, and each hinge is located near a position where the corresponding lateral plate intersects the ceiling wall; and holding walls that correspond to the lateral plates, wherein the holding walls and the lateral plates connect the ceiling wall to the bag holder, and wherein each of the holding walls extends downward from an inner end of the corresponding one of the lateral plates and is connected to the bag holder, and each hinge is located near the corresponding one of the spaces at a position that is outward of the corresponding one of the holding walls and lower than a part of the ceiling wall that is directly above the corresponding one of the holding walls; and a switch operating portion located on at least one of the boss and the spoke and located on an area other than the doors such that the switch operating portion is not covered by one of the doors when the doors open.

2. A steering wheel including an airbag apparatus according to claim 1, wherein:

the breakable portion forms a substantially T-shaped form as viewed in the axial direction of the steering wheel;

the T-shaped form has a lateral portion and a longitudinal portion;

the lateral portion extends substantially in the right-left direction and substantially in the longitudinal direction of the first and second spokes;

the longitudinal portion extends substantially rearward from a central portion of the lateral portion and substantially in the longitudinal direction of the third spoke;

the breakable portion includes left and right extending portions located at right and left ends of the lateral portion, and the extending portions are directed toward the longitudinal direction of the first and second spokes; and a rear extending portion is located at a rear end of the longitudinal portion, and the rear extending portion is directed towards the longitudinal direction of the third spoke.

3. A steering wheel including an airbag apparatus according to claim 1, wherein:

the pad includes a general portions extending downward directly from the ceiling wall; and certain sections of the breakable portion, which are sections that are not located between two adjacent doors, extend along and adjacently to corresponding parts of the general portions.

4. A steering wheel having an airbag apparatus according to claim 3, further comprising an auxiliary plate having a restriction wall disposed on an outer surface of a portion of the holding wall connected to the bag holder, wherein the auxiliary plate is fixed to the bag holder, and wherein the bag holder includes a retaining pawl for retaining the holding wall, and wherein the pad is prevented by the restriction wall from coming out from the retaining pawl, and the pad is connected to and held by the bag holder.

5. A steering wheel having an airbag apparatus according to claim 1, wherein the pad is held by the bag holder using a rivet.

6. A steering wheel having an airbag apparatus according to claim 1, wherein the bag holder includes a retaining pawl for retaining the pad, and the pad is held by the bag holder with the rivet and the retaining pawl.

7. A steering wheel having an airbag apparatus according to claim 1, further comprising an auxiliary plate having an insertion piece to be inserted into the pad, the auxiliary plate being fixed to the bag holder, wherein the bag holder includes a retaining pawl for retaining the pad to the bag holder, and the pad is sandwiched between the insertion piece and the retaining pawl and held by the bag holder.

8. A steering wheel having an airbag apparatus according to claim 1, wherein ends of the breakable portion are hidden behind corresponding ones of the lateral plates as viewed from the lower side of the pad.

9. A steering wheel including an airbag apparatus, the steering wheel comprising:

a ring which is held by an operator for steering;

a boss located at a center of the ring, wherein the airbag apparatus is located on the boss;

first, second, and third spokes for connecting the ring and the boss, wherein a space is located between each adjacent pair of the spokes;

a steering wheel body;

an airbag folded such that the airbag is expandable;

an inflator for supplying expansion gas to the airbag;

a pad for covering the folded airbag, wherein the pad includes first, second, and third doors, each of the doors being provided at its periphery with a breakable portion, and each door is pushed by the airbag when the airbag expands such that the breakable portion is ruptured, and each door opens around a hinge located on an outer periphery of the pad, such that one opening, through which the airbag projects, is formed in a center of the pad, and each of the doors is located in a respective one of the three spaces when opened, and each hinge is located near a respective one of the spaces;

a bag holder connected to the steering wheel body for holding the folded airbag, the inflator and the pad wherein the folded airbag includes three clots of folding portions, and each clot is located below a corresponding one of the doors; and first, second, and third holding portions for securing the pad to the bag holder, wherein each of the holding portions is held by the bag holder and each of the holding portions corresponds to and is near one of the hinges, wherein each hinge is located on an outer periphery of the pad at a position that is lower than a point on the pad that is directly above the corresponding holding portion;

a switch operating portion located on at least one of the bass and the spoke and located on an area other than the doors such that the switch operating portion is not covered by one of the doors when the doors open.

* * * * *